United States Patent [19]

Saegusa

[11] Patent Number: 4,896,181
[45] Date of Patent: Jan. 23, 1990

[54] CAMERA SYSTEM

[75] Inventor: Takashi Saegusa, Kawasaki, Japan

[73] Assignee: Nikon Corporation, Tokyo, Japan

[21] Appl. No.: 302,069

[22] Filed: Jan. 25, 1989

Related U.S. Application Data

[63] Continuation of Ser. No. 31,050, Mar. 27, 1987, abandoned.

[30] Foreign Application Priority Data

Mar. 31, 1986 [JP] Japan .................................. 61-73272
Mar. 31, 1986 [JP] Japan .................................. 61-73914

[51] Int. Cl.$^4$ ............................................. G03B 17/00
[52] U.S. Cl. .................................. 354/286; 354/273; 354/289.12
[58] Field of Search ................... 354/286, 273, 289.12, 354/455

[56] References Cited

U.S. PATENT DOCUMENTS 4,477,164 10/1984 Nakai et al. .......................... 354/286
4,509,842 4/1985 Maniguchi et al. .................. 354/286

Primary Examiner—L. T. Hix
Assistant Examiner—David M. Gray
Attorney, Agent, or Firm—Shapiro and Shapiro

[57] ABSTRACT

Camera system having a camera body and an accessory detachably mounted thereon. The camera body and accessory are provided with terminals for transmitting information data signals therebetween. The information data stored in a memory in the accessory is transmitted to the camera body in a selected mode responsive to a command data signal output from the camera body. In a first mode all information data is transmitted in a second mode part of the information data is transmitted.

22 Claims, 16 Drawing Sheets

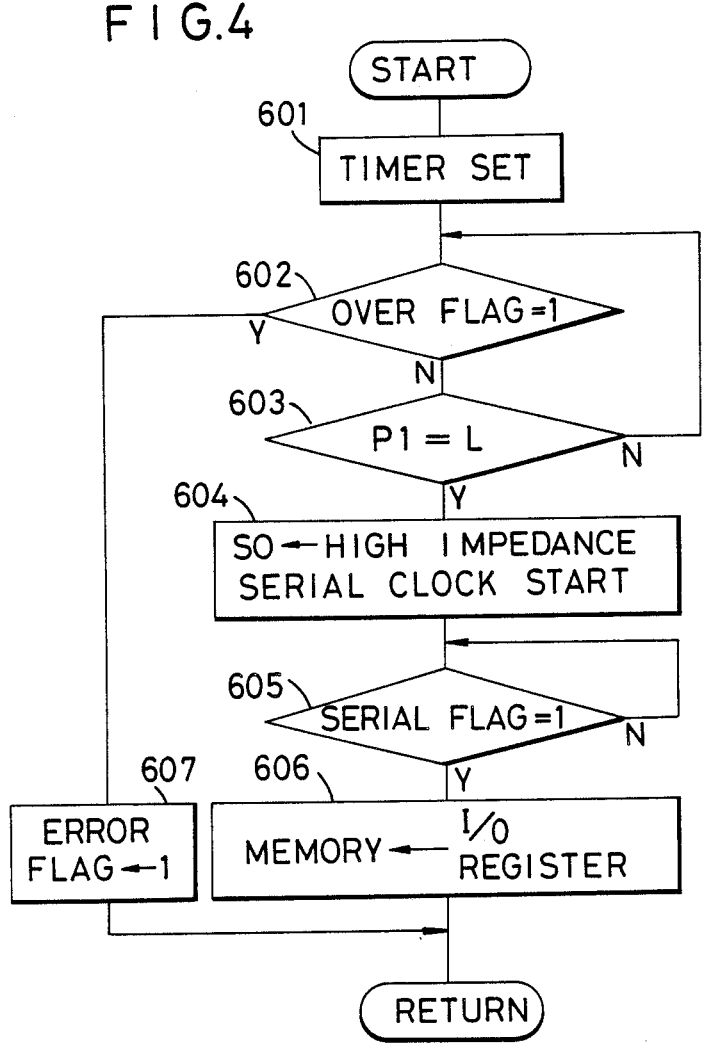

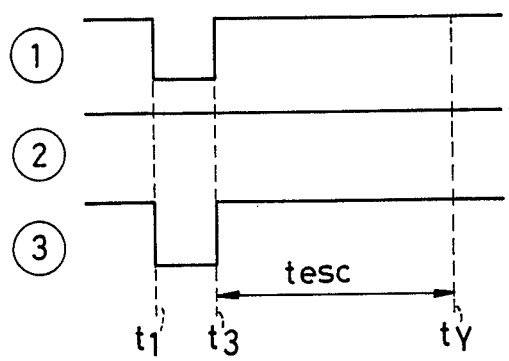
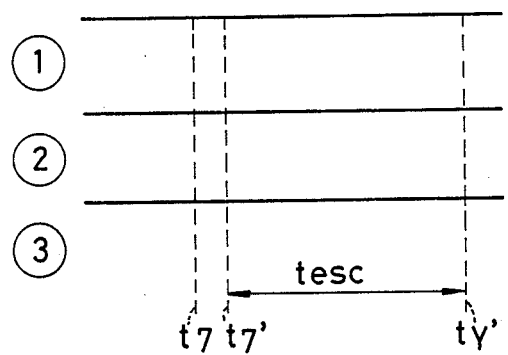
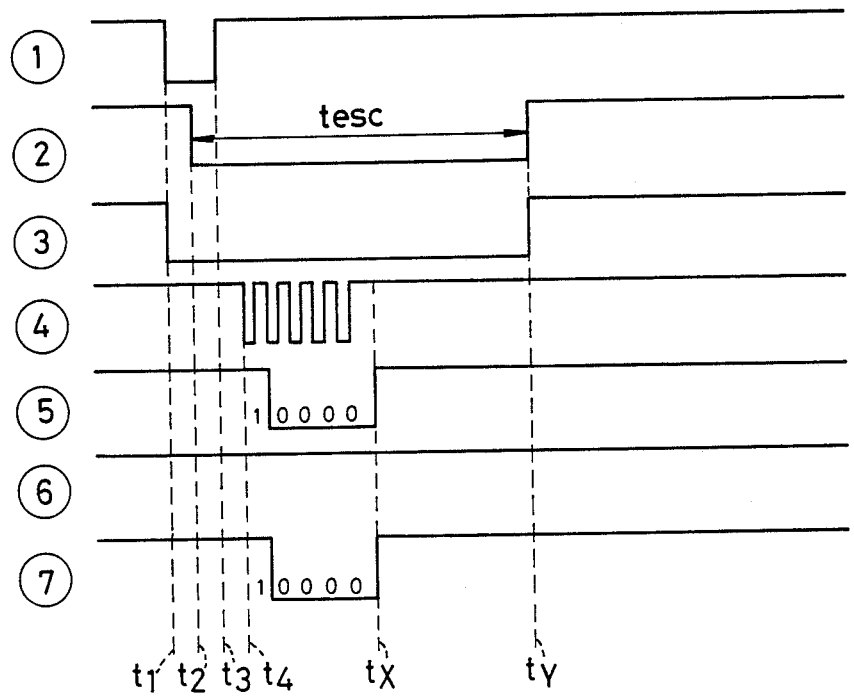

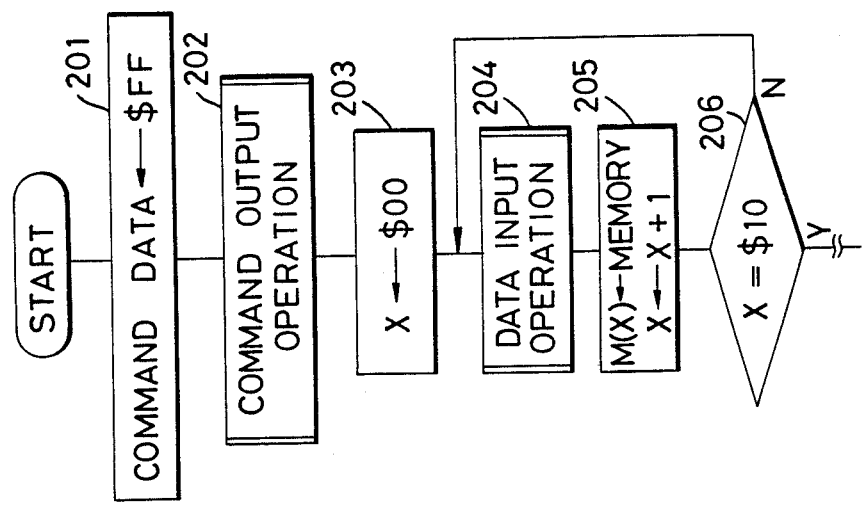
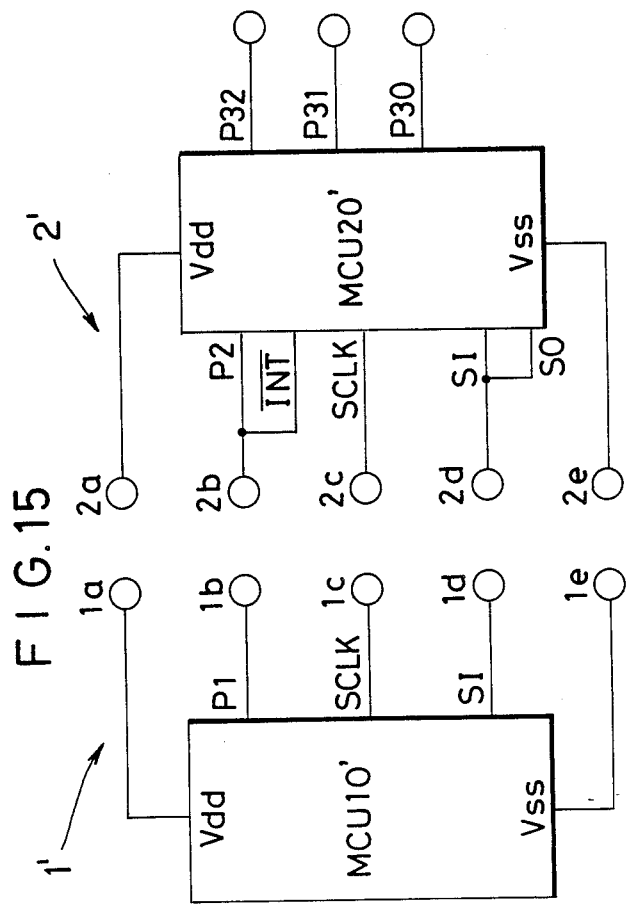

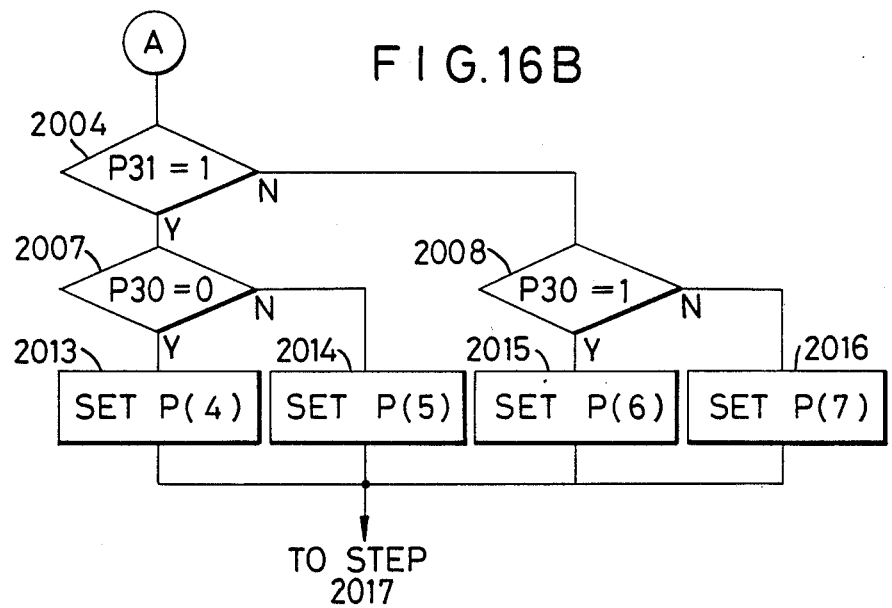
FIG. 16B
FIG. 16C
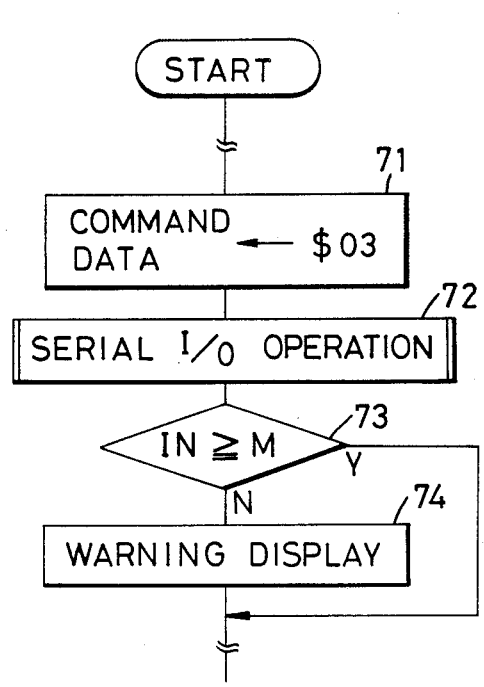
FIG. 18

CAMERA SYSTEM

This is a continuation of application Ser. No. 031,050 filed Mar. 27, 1987, now abandoned.

BACKGROUND OF THE INVENTION

1. Field of the Invention

The present invention relates to a camera system having an accessory, which can be attached to a camera body, and has an electrical contact connected to the camera body when it is attached to the camera body, so that data associated with photographing data, stored in the accessory, can be transferred to the camera body.

2. Related Background Art

As camera systems described in the prior art and related the present invention, two typical conventional camera systems are known. In one camera system, data stored in a lens is sent back to a camera body in response to address data serially transferred from the camera body. In the other camera system, data stored in a lens is sent back to a camera body in response to start pulses generated from the camera body. The following problems in such systems are posed, taking into consideration cameras having various functions. More specifically, in the first system, each time one data in the lens is to be read, address data must be designated. If a large volume of data must be read, a time interval required for designating address data is undesirably long. In the second system, when all the data in the lens is to be transferred to the camera body, if the camera body comprises a small-capacity RAM (Random Access Memory), the data cannot be stored therein. In addition, data volume is increased, a time required for data transfer is prolonged, and a problem may occur in accordance with a processing content.

SUMMARY OF THE INVENTION

It is an object of the present invention to provide a camera accessory which can transfer data stored therein to camera body having various functions in an optimal state.

According to an aspect of the present invention, means for discriminating serial data sent from a camera body to an accessory is provided, and modes for transferring data stored in the accessory to the camera body are switched in accordance with the discrimination result.

BRIEF DESCRIPTION OF THE DRAWINGS

FIG. 4 is a flow chart of a data input operation subroutine of the MCU 10;

FIGS. 11A and 11B are timing charts when no response is sent from the MCU 20;

FIG. 12 is a timing chart when a trouble occurs in the MCU 20;

FIGS. 13 and 14 show a second embodiment of the present invention, in which FIG. 13 is a flow chart of a main routine of an MCU 10 and FIG. 14 is a flow chart of the main routine of the MCU 10;

FIG. 15 is a block diagram showing still another embodiment of the present invention;

FIGS. 16A and 16B are flow charts of a main routine of an MCU 20';

FIG. 16C is a flow chart of an interrupt operation of the MCU 20';

FIG. 18 is a partial flow chart of an MCU 10.

DETAILED DESCRIPTION OF THE PREFERRED EMBODIMENTS

Figure 1:
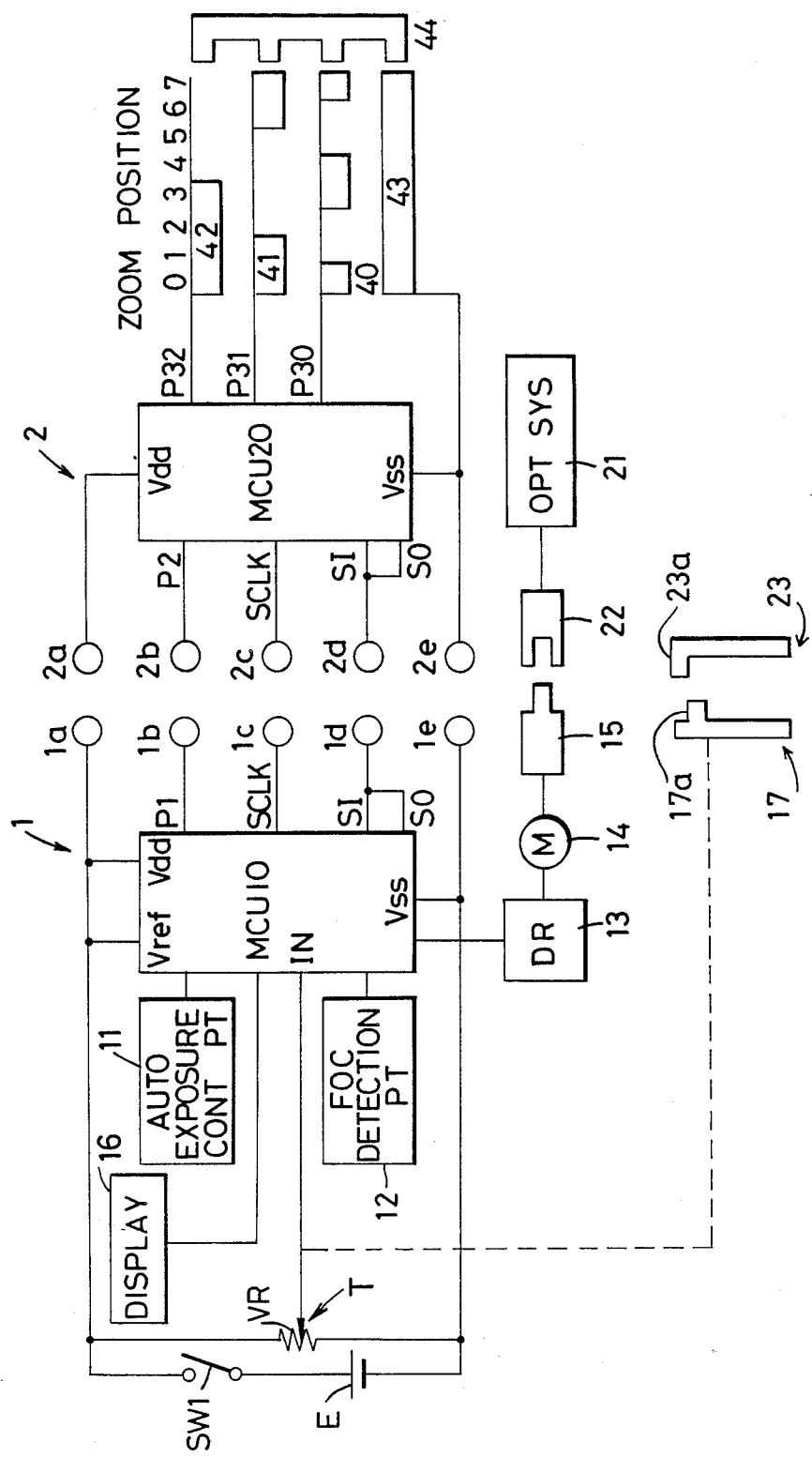
FIG. 1 is a block diagram showing a first embodiment of the present invention.

FIG. 1 is a block diagram showing a first embodiment of the present invention. A camera system shown in FIG. 1 includes a camera body 1 and an interchangeable lens 2 (a lens capable of automatic focusing). The camera body 1 has a function for automatic exposure control, automatic focusing control, and the like, and includes a microcomputer (to be referred to as an MCU hereinafter) 10, an automatic exposure control part 11, a focus detection part 12, a motor driver 13, a motor 14, and a coupler 15. The camera body 1 can exchange data with the interchangeable lens 2 through electrical contacts or terminals 1a to 1e. A power source switch SW1 is a switch which is turned on by a half-depression operation of a release button. When the switch SW1 is turned on, a voltage V1 of a power source E in the camera is supplied to the entire circuit of the camera body 1, and is also supplied to the interchangeable lens 2 through the power supply terminal 1a. The exposure control part 11 performs known exposure control processing under the control of the MCU 10. The MCU 10 determines a driving direction and a driving amount of the motor 14 in accordance with the output from the focus detection part 12, and outputs a drive signal to the driver 13, thereby controlling rotation of the coupler 15. The coupler 15 is engaged with a coupler 22 of the lens 2 attached to the camera body 1, and performs an automatic focusing (AF) operation by moving an optical system 21. The MCU 10 is a microcomputer having a known serial interface. A serial clock terminal SCLK of the MCU 10 is connected to the electrical contact 1c, and a serial output terminal SO and serial input terminal SI thereof are commonly connected to the electrical contact 1d. An input/output terminal P1 is connected to the electrical contact 1b, and the electrical contact 1e serves as a ground (GND) terminal.

Figure 17A:
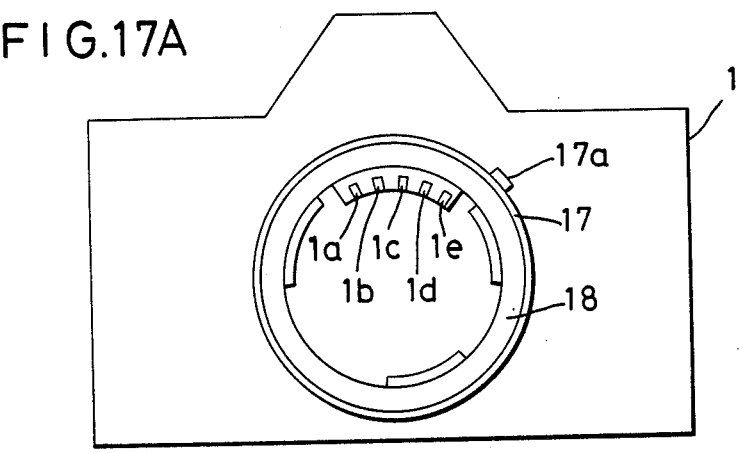
FIGS. 17A, 17B, 17C and 17D are schematic views showing an aperture interlock lever of a camera and a present aperture ring.

A display 16 performs display in association with exposure control and the AF operation in accordance with a control signal from the MCU 10. An aperture interlock lever 17 (ring-shaped, as seen in FIG. 17A to be discussed later) receives position data of a preset aperture ring 23 of the lens 2, that is, stop number difference data from a full-aperture value AV0 to an aperture value AV preset by the preset aperture ring 23, i.e., a stopped-down-aperture value difference signal (AV−AV0). The movement of the aperture interlock lever 17 is transmitted to a variable resistor VR. The stopped-down-aperture value difference (AV−AV0) data is input to an analog input terminal IN of the MCU 10 as a potential of a terminal T of the variable resistor VR. The MCU 10 A/D converts the data, and can read the A/D-converted value. The MCU 10 has an 8-bit A/D conversion function. An A/D conversion reference input terminal Vref of the MCU 10 receives the same voltage V1 as a power source terminal voltage Vdd of the MCU 10. When the potential input to the analog input terminal IN is the same as that at the GND terminal, an A/D-converted value of the voltage input to the analog input terminal IN is given as $00 (represented by hexadecimal notation). Each time the input voltage to the terminal IN is increased by V1/255 step, the A/D-converted value is incremented by one. Assume that one stopped-down-aperture value difference is represented by 12 steps, the A/D-converted value at the terminal of the resistor VR is updated up to $60 (hexadecimal notation; corresponding to 96 of decimal notation), and data of the stopped-down aperture value difference corresponding to up to the eight stop values is allowed to be read.

The interchangeable lens barrel (photographing lens) 2 comprises an MCU 20, an optical system 21, and a coupler 22. The coupler 22 is engaged with the coupler 15 of the camera body 1, and moves the optical system 21 to a position (in-focus position) determined by the output from the focus detection part 12. The MCU 20 has the same serial interface as that in the MCU 10. A serial clock terminal SCLK is connected to an electrical contact 2c, a serial input terminal SI and a serial output terminal SO are commonly connected to an electrical contact 2d, and an input/output terminal P2 is connected to an electrical contact 2b. An electrical contact 2a applies the power source voltage V1 of the camera to the MCU 20 as the power source terminal, and an electrical contact 2e serves as a GND terminal. A zoom encoder (40 to 44) is constituted by gray codes 40 to 42 connected to input terminals P30 to P32 of the MCU 20, a GND pattern 43, and a brush 44 interlocked with the operation of a zoom ring (not shown). In this embodiment, the lens 2 is a zoom lens whose focal length can vary within the range of 35 mm to 70 mm. Upon change in focal length, the full-aperture value also changes from F3.3 to F4.5, due to a low-cost structure. However, the positions of the zoom ring are classified into eight sections to determine a gray code pattern, as shown in Table 1 below, and the MCU can detect the position of the zoom ring in accordance with the inputs from the input terminals P30 to P32 which are pulled up by resistors arranged therein.

TABLE 1

| Zoom Position | p32 (42) | P31 (41) | P30 (40) | Focal Length |
|---|---|---|---|---|
| 0 | 0 | 0 | 0 | 35 mm |
| 1 | 0 | 0 | 1 | |
| 2 | 0 | 1 | 1 | |
| 3 | 0 | 1 | 0 | |
| 4 | 1 | 1 | 0 | |
| 5 | 1 | 1 | 1 | |
| 6 | 1 | 0 | 1 | |
| 7 | 1 | 0 | 0 | 70 mm |

Table 2 is a table of data associated with photographing data stored in the MCU 20 when the zoom lens (focal length: 35 mm to 70 mm, F number: F3.3 to F4.5) is used. Parameters for determining the types of data are represented by the X coordinates, and parameters indicating the position of the zoom encoder are represented by the Y coordinates. Note that mark "$" (representing hexadecimal notation) is omitted from numerical values designated by X and Y in Table 2. When the zoom encoder is constituted by the gray codes as shown in Table 1, a pattern can change at only one position of any adjacent positions. Therefore, it is known that no position read error occurs. When the gray codes are used, a gray code input is normally converted to a binary code. However, in Table 2, the gray code input corresponds directly to the Y coordinate of the table. Therefore, 0 to 7 as the Y coordinates do not correspond to the order of positions of the zoom encoder. The lowermost column of Table 1 corresponds to the zoom position in FIG. 1 and Table 1. Even through the positions are disordered, data can be output in accordance with an input corresponding to each zoom position. Therefore, no problem is posed. In this case, the gray code need not be converted to the binary code, as described above.

TABLE 2

| | Y | | | | | | | | |
|---|---|---|---|---|---|---|---|---|---|
| | 0 | 1 | 2 | 3 | 4 | 5 | 6 | 7 | Content |
| 0 | 44 | 47 | 4E | 4B | 5C | 58 | 52 | 55 | Focal Length |
| 1 | 2A | 2B | 2E | 2C | 33 | 34 | 33 | 30 | Full-aperture Value |
| 2 | 05 | ← | ← | ← | ← | ← | ← | ← | Lens ID Number |
| 3 | 42 | ← | ← | ← | ← | ← | ← | ← | Maximum Stopped-down-aperture Value Difference |
| 4 | 44 | ← | ← | ← | ← | ← | ← | ← | Wide-end Focal Length |
| 5 | 5C | ← | ← | ← | ← | ← | ← | ← | Telephoto-end Focal Length |
| 6 | 2A | ← | ← | ← | ← | ← | ← | ← | Wide-end Full-aperture Value |
| 7 | 34 | ← | ← | ← | ← | ← | ← | ← | Telephoto-end Full-aperture Value |
| 8 | C0 | A6 | 80 | 92 | 92 | A7 | DE | C1 | Conversion Coefficient KD(1) |
| 9 | FF | FF | FF | FF | FE | FE | FE | FE | Conversion Coefficient KD(2) |
| A | 10 | 10 | 10 | 10 | 12 | 12 | 12 | 12 | Aberration Data |
| B | C0 | ← | ← | ← | ← | ← | ← | ← | Lens Type |
| C | 03 | ← | ← | ← | ← | ← | ← | ← | MCU Version |
| D | 00 | ← | ← | ← | ← | ← | ← | ← | Supplementary |
| E | 00 | ← | ← | ← | ← | ← | ← | ← | Supplementary |
| F | FF | ← | ← | ← | ← | ← | ← | ← | Supplementary |

TABLE 2-continued

| | | | Y | | | | | |
|---|---|---|---|---|---|---|---|---|
| 0 | 1 | 2 | 3 | 4 | 5 | 6 | 7 | Content |
| 0 | 1 | 3 | 2 | 7 | 6 | 4 | 5 | Zoom position |

When the lens 2 is set at a 35-mm position by the zoom ring (not shown), the position of the zoom encoder (zoom position) is "0", as shown in FIG. 1 and Table 1, and the gray code is "000", as shown in Table 1. Data digits in the column of "Y=0" in Table 2 are output from the MCU 20. Focal length data is stored at a position of "X=0" in the table in the MCU 20. For example, if Y=0, data "$44" corresponding to 35 mm is stored. At the position of "X=1", full-aperture value data is stored. For example, if Y=0, data "$2A" corresponding to F3.3 (AV 7/2) as the full-aperture value at the 35-mm position is stored. At the position of X=2, data for identifying lenses is stored irrespective of the Y coordinate. This data is assigned in the release order of lenses. In general, if the optical system 21 of the lens is changed, this data is updated. In this case, data "$05" that means a fifth lens is stored. Data at positions "X=2" to "X=7" and "X=B" to "X=F" are fixed data digits which do not change in accordance with a focal length, and the identical data bits are used for Y=1 to 7. Therefore, they are indicated by marks "←". At the position of "X=3", a signal representing the maximum stopped-down-aperture value difference is stored. In this embodiment, if Y=0, the full-aperture value corresponds to F3.3 (AV 7/2), and the minimum aperture size corresponds to F22 (AV 9). Therefore, the maximum stopped-down-aperture value difference as a difference is 5.5. Therefore, data "$42" is stored. When the full-aperture value is changed upon operation of the zoom ring, the minimum aperture size is changed accordingly. Thus, the maximum stopped-down-aperture value difference is fixed data. At the position of "X=4", wide-end focal length data is stored. More specifically, if Y=0 or the zoom position is "0", the same data as the focal length data of X=0 when Y=0 is stored. At the position of "X=5", telephoto-end focal length data is stored. More specifically, if Y=4 or the zoom position is "7", focal length data of X=0 is stored. At the position of "X=6", the wide-end full-aperture value data is stored. If Y=0 or the zoom position is "0", the same data as the full-aperture value of "X=1" is stored. At the position of "X=7", telephoto-end full-aperture value data is stored. More specifically, if Y=4 or the zoom position is 7, the same data as the full-aperture value of "X=1" is stored. At the positions "X=8" and "X=9", conversion coefficient data KD necessary for automatic focusing (to be referred to as AF hereinafter) is stored. As disclosed in U.S. Pat. No. 4,509,842, this data is used for obtaining a driving amount of a motor drive (corresponding to 13) by calculating $|\Delta L| \times KD$ from a defocusing amount $|\Delta L|$ which is obtained by processing a signal from a focus detection part (corresponding to 12) by a microcomputer (corresponding to the MCU 10). In U.S. Pat. No. 4,509,842, an index part and a significant digit part respectively consist of 4 bits (a total of 1 byte (8 bits)). In this embodiment, the index and significant digit parts each consists of 1 byte (8 bits) in order to improve precision. Data of the significant digit part of the conversion coefficient KD is stored at the position of "X=8" as the conversion coefficient KD(1), and data of the index part of the conversion coefficient KD is stored at the position of "X=9" as the conversion coefficient KD(2). If decimal numbers corresponding to data stored at positions "X=8 & 9" are given as m and n, respectively, the following relation is established:

$$KD = (m/128) \cdot 2^n$$

If Y=0, since KD(1)=$C0, m=192. In this case, since KD(2)=$FF, n=−1. Therefore, $$KD = (192/128) \times 0.5 = 0.773$$

If Y=4 corresponding to the zoom position "7", then m=146 and n=−2, since KD(1)=$92 and KD(2)=$FE. Therefore, $$KD = (146/128) \times 2^{-2} = 0.285$$

At the position of "X=A", aberration data is stored. If Y=0 at the wide end (zoom position "0"), since a 160-μm positive displacement occurs, data "$10" is stored. At the position of "X=B", data indicating a lens type is stored. If data "1" is set in the most significant bit (bit "7"), this indicates that the lens can be driven by a coupler, and if data "1" is set in bit "6", this indicates that data bits of the lens are changed by the zoom encoder. For this reason, at the position of "X=B", data "$C0" is stored. At the position of "X=C", a version signal (a signal indicating a history of software versions) of the MCU arranged in the lens is stored. In this case, data "$03" that means the MCU 20 in the lens is third software version, is stored. At the positions of "X=D" and "X=E", data "$00" is stored as supplementary data. At the position of "X=F", data "$FF" is stored as supplementary data. These areas are provided for lenses having new functions, and store data indicating "undefined" or "no function" in accordance with data contents set at that time.

TABLE 3

| Command | Content |
|---|---|
| $00 | Send back data of a focal length (X = 0) of the zoom position when the command is received. |
| $01 | Send back data of a full-aperture value (X = 1) of the zoom position when the command is received. |
| $02 | Send back data of a lens ID signal (X = 2) of the zoom position when the command is received. |
| $0F | Send back data of X = F of the zoom position when the command is received. |
| 10–$FB | Although undefined command, if it is accessed, send back data "$FF" the same as data in "X=" F. |
| $FC | Send back 2-byte data of conversion coefficients KD(1) and KD(2) of "X =8" and "X =9" of the zoom position when the command is received. |
| $FD | Send back 8-byte data mainly associated with AF from "X =8" to "X =F" of the zoom position when the command is received. |
| $FE | Send back 8-byte data mainly associated with AE from "X =8" to "X =F" of the zoom position when the command is received. |
| $FF | Send back all data set for the lens 2 from "X =0" to "X =F" of the zoom position |

TABLE 3-continued

| Command | Content |
|---|---|
| | when the command is received |

Table 3 shows the contents of commands which are supplied from the camera body 1 to the lens 2.

When the MCU 20 of the lens 2 receives 1-byte (8-bit) data serially output from the MCU 10 of the camera body 1, the MCU 20 discriminates the content of the received data, and outputs data stored therein in accordance with the discriminated content. More specifically, the MCU 20 uses data output from the camera body 1 as a command, and outputs data corresponding thereto.

If command data "$00" is output from the MCU 10, the MCU 20 outputs or sends back 1-byte (8 bits) focal length data corresponding to "X=0" in Table 2 (i.e., any of 44, 47, 4E, . . . , 52, and 55) to the MCU 10 of the camera body 1. In this embodiment, since the lens 2 is a zoom lens, data of the Y coordinate at the zoom position when the command is received is sent back to the MCU 10. If the lens 2 is a single-focal point lens such as a 50-mm, F1.8 lens, data corresponding to a focal length of 50 mm is simply sent back to the MCU 10. In response to the commands "$01" to "$0F", data, which is designated by the Y coordinate determined by the zoom position when the corresponding command is received and the X coordinate corresponding to the command, is sent back to the MCU 10 of the camera body 1.

The commands "$10" to "$FB" have undefined contents for the lens 2. However, if such commands are sent from the MCU 10 of the camera body 1, data "$FF" as a default value is sent back to the MCU 10. Thus, the MCU 10 can detect that a lens which receives a command cannot cope with the command. In Table 2, if "X=D" and "X=E", since the MCU 20 stores data "$00", it sends this data as the default value. If "X=F", since the MCU 20 stores data "$FF", it sends back this data.

When the MCU 20 receives the command "$FC", it subsequently sends back 2-byte data of the conversion coefficients KD(1) and KD(2) in "X=8" and "X=9" at the zoom position when the command is received. It is important to subsequently send back the 2-byte data. Since the conversion coefficient data KD is divided into the index part and the significant digit part, this data can be separately accessed by the commands "$08" and "$09". In this case, the zoom position when the index part data is received may be different from that when the significant digit part data is received. See Table 2. Since the zoom positions "3" and "4" are adjacent to each other, as shown in FIG. 1, there is no problem when the MCU 10 receives either a set of data "$80" or "$FF" and a set of data "$DE" and "$FE" at a switching point as shown in Table 4 below.

TABLE 4

| | Zoom Position 3 | Zoom Position 4 |
|---|---|---|
| Significant digit part KD(1) | $80 | $DE |
| Index part KD(2) | $FF | $FE |

However, if the data KD is accessed by one byte, the MCU 10 receives a set of data "$80" and "$FE" or a set of data "$DE" or "$FF" during the operation of the zoom ring, so that the received data may have quite erroneous content. More specifically, since the set of data "$80" and "$FE" becomes smaller than the data of the zoom position "7", and the set of data "$DE" or "$FF" becomes larger than data of the zoom position "0". In this embodiment, however, since either data of the zoom position "3" or "4" is sent back in response to the command "$FC", no problem is posed. In this embodiment, data is changed by the zoom encoder upon movement of the zoom ring. This principle can be applied to a case wherein an output of an encoder is changed in accordance with focusing in a microlens and the like.

If the MCU 20 receives the command "$FD", it sends back, to the MCU 10, 8-byte data mainly associated with AF in "X=8" to "X=F" in Table 2 in the Y coordinate determined by the zoom position when the command is received.

Similarly, in response to the command "$FE", the MCU 20 sends back 8-byte data mainly associated with AE control in "X=0" to "X=7" in Table 2 to the MCU 10.

In response to the command "$FF", 16-byte data in all the area defined for the lens 2 in "X=0" to "X=F" in Table 2 is sent back to the MCU 10.

Figure 2:
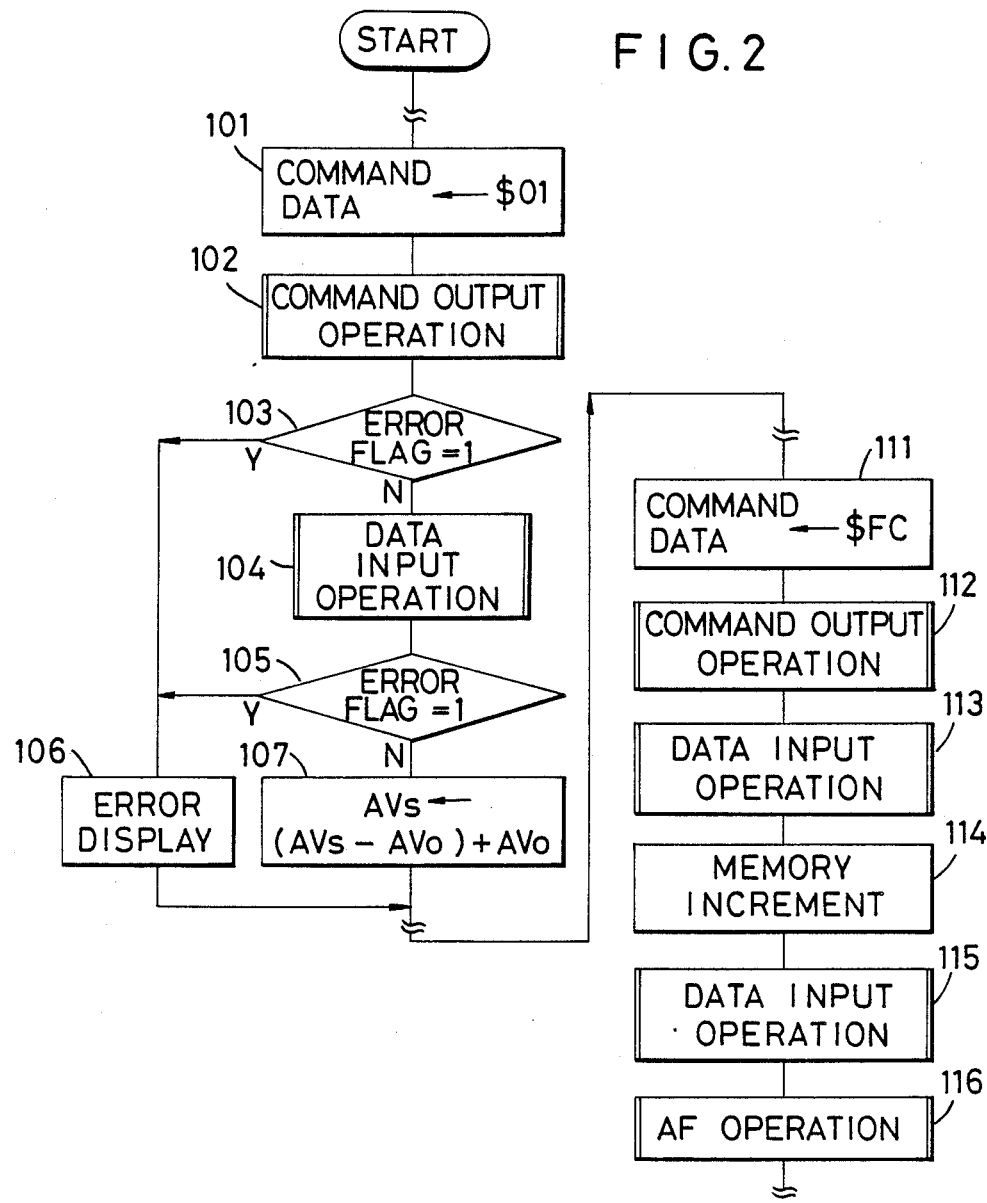
FIG. 2 is a flow chart of part of a main routine of an MCU 10.

FIG. 2 is part of the main flow chart of the MCU 10 of the first embodiment. The MCU 10 requires the full-aperture value data during its operation. In step 101, data "$01" is set in a predetermined memory of the MCU 10 as the command data. The data "$01" is data for requesting the full-aperture value of the lens 2, as shown in Table 3. In step 102, the MCU 10 calls a command output operation subroutine, and outputs the value of "$01" set in step 101 from the electrical contacts 1d and 2d in synchronism with serial clocks at the electrical contacts 1c and 2e. At this time, if an error occurs, data "1" is set in an error flag. In this case, the MCU 10 detects the error in step 103, and the flow jumps to step 106. If the command output is normally performed, data "0" is set in the error flag, and the MCU 10 calls a data input operation subroutine shown in FIG. 4 in step 104. The MCU 10 then receives, from the MCU 20, the full-aperture value data corresponding to the command "$01" set in step 101 through the contacts 1b and 2b. In step 105, if an error occurs during execution of step 104, data "1" is set in the error flag in the same manner as in step 103, and the flow jumps to step 106. If no error occurs, data "0" is set in the error flag, and the flow advances to step 107. In step 107, the MCU 10 calculates an aperture value AVs to be controlled by adding AV0 and the stopped-down-aperture value difference (AVs - AV0) calculated in, e.g., a shutter-speed priority mode (S mode). In this manner, the aperture value can be displayed.

The error flag set in step 509 in FIG. 3 or step 607 in FIG. 4 (to be described later) (set to "1") corresponds to a specific bit in the RAM of the MCU 10. This error flag is reset at the beginning of the main routine (FIG. 2) of the MCU 10 after power-on reset, and is also reset immediately after it is detected in step 103 or 105 in FIG. 2 that an error occurs. Different bits can be used for the error flag in accordance with timings when errors occur. When steps 107 to 111 are executed, the flow enters pre-processing for the AF operation from step 111. In step 111, the MCU 10 sets a command $FC and calls a command output operation subroutine in FIG. 3 in step 112. As shown in Table 3, the MCU 10 fetches 2-byte data consisting of the conversion coefficients KD(1) and KD(2). When the MCU 10 calls the data input operation subroutine shown in FIG. 4 in step 113, in the same manner as step 104, it fetches the conversion coefficient KD(1) from the MCU 20 through the electrical contacts 1b and 2b, and can store the received data in a predetermined memory. Since a total of data volume to be received is 2 bytes, a memory for storing the received data is incremented in step 114. Then, the MCU 10 again calls the data input operation subroutine in step 115, and receives the conversion coefficient KD(2) through the contacts 1b and 2b. In step 114, the received data is stored in the incremented memory. In this manner, the conversion coefficients KD(1) and KD(2) can be stored in the continuous 2-byte memory area in the MCU 10. The MCU 10 calls the AF operation subroutine in step 116. The detailed description of the AF operation is not directly related to the present invention, and is omitted. A control amount is calculated from the defocusing amount ΔL obtained by the MCU 10 and the conversion coefficient data KD previously received from the lens 2, and the motor driver 13 is driven accordingly, thereby driving the motor 14. The optical system 21 of the lens 2 is moved via the couplers 15 and 22, and an object can be focused on a focal plane (not shown) of the camera body 1.

Figure 3:
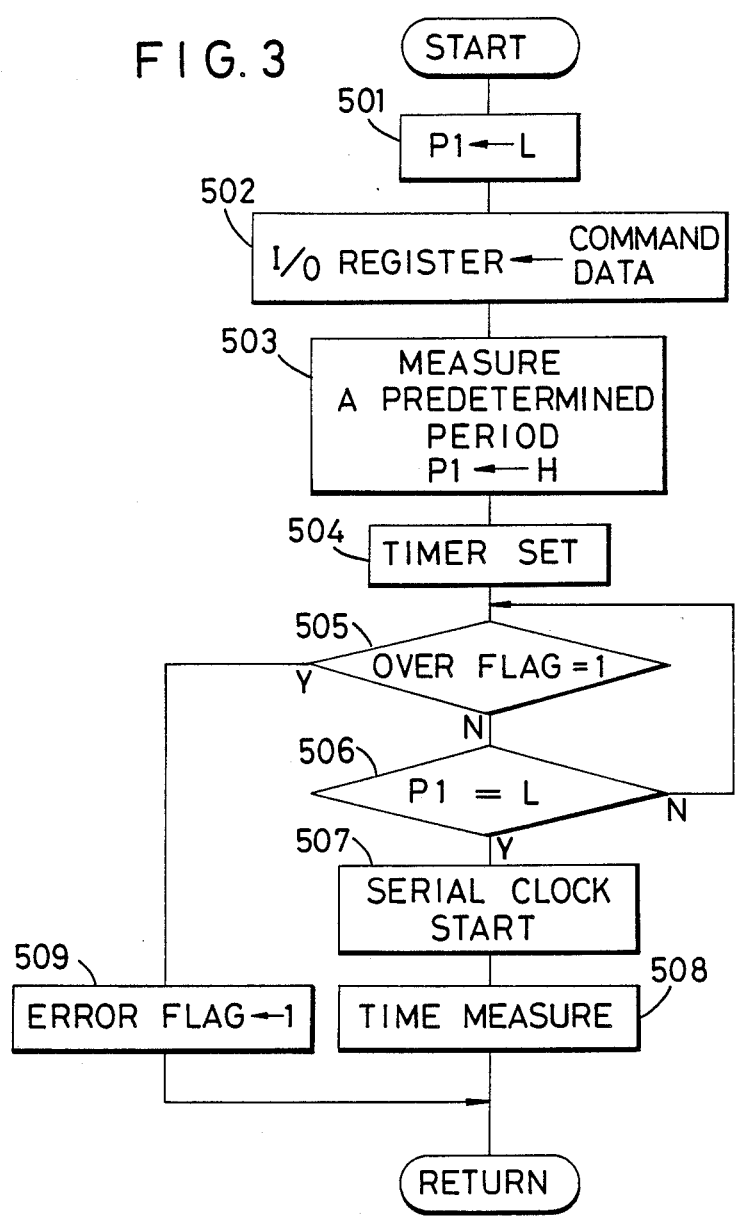
FIG. 3 is a flow chart of a command output operation subroutine of the MCU 10.

FIG. 3 is a flow chart of the command output operation subroutine of the MCU 10. When the MCU 10 calls the command output operation subroutine, the input/output terminal P1 is set in an output mode in step 501, so as to produce a low-level (to be referred to as "L" level hereinafter) output from the terminal P1. This L-level output serves as an energization signal for informing the MCU 20 of the lens 2 a state wherein the MCU 10 requires data and for starting data serial transfer exchange. The MCU 10 transfers command data stored in a predetermined memory to a serial input/output register (indicated by "I/O register" in the flow chart) in step 502. After a predetermined period of time has passed in step 503, the output level of the input/output terminal P1 is set at high level (to be referred to as "H" level hereinafter), thereby switching the input mode. In step 504, a predetermined time tesc is set in an internal timer for escape, and the timer is started. Since an over flag of the timer is changed from "0" to "1" after the time tesc has passed, the MCU 10 can detect the lapse of the predetermined time tesc by monitoring this flag. In step 505, the MCU 10 checks if the over flag is "1". If the over flag is "1" and an overflow occurs, the flow jumps to step 509. Since the operation cannot be completed within the predetermined time (tesc), data "1" is set in the error flag, and this flag is used in the post-processing. If the over flag is "0", since the operation can be completed in the predetermined time (tesc), the flow advances to step 506. In step 506, the MCU 10 checks if the input/output terminal P1 is at L level. Since the MCU 20 of the lens 2 sets the terminal P1 at L level when it completes preparation for command reception, the MCU 10 monitors this. When the L-level output is produced from the terminal P2 of the MCU 20, the input of the input/output terminal P1 in the input mode is set at L level. Therefore, the flow can advance to step 507. If the input of the terminal P1 is at H level, the flow returns to step 505. The operations of steps 505 and 506 are repeated until the input of the terminal P1 is at L level. If the operations of steps 505 and 506 cannot be completed within the predetermined time tesc, the flow advances to step 509. However, if the input of the terminal P1 is at L level within the predetermined time tesc, the flow advances to step 507, and the serial clock terminal SCLK of the MCU 10 begins to generate a serial clock. In synchronism with 8 pulses of the serial clock, the command data stored in the serial input/output register is output bit by bit from its least significant bit (LSB) in step 502. One-byte (8-bit) data is thus output from the serial output terminal SO in response to the 8 pulses of the serial clock, and is transferred to the serial input terminal SI of the MCU 20 through the electrical contacts 1d and 2d. In step 508, after the MCU 10 has measured a time required for this transfer and a time required for discriminating the command by the MCU 20, the flow returns to the main routine, and the subroutine operation is ended.

FIG. 4 is a flow chart of the data input operation subroutine of the MCU 10. In the main flow of the MCU 10, if the MCU 10 requires the data stored in the lens 2, a command, shown in Table 3, for obtaining the data is sent to the lens 2. Then, since the data corresponding to the command is sent back from the lens 2, the data input operation subroutine is called at that time. The operation contents in steps 601 to 603 are the same as those in steps 504 to 506 in the command output operation subroutine described above. Note that the limit time tesc need not always be the same as a time set in step 504 in FIG. 3. If the input of the terminal P1 is set at L level within the predetermined time tesc, the flow advances from step 603 to step 604, the serial output terminal of the MCU 10 is set in the high-impedance state, and the serial clock terminal SCLK of the MCU 10 begins to produce the serial clock without influencing the signal input to the serial input terminal SI connected thereto. The serial clock is input to the serial clock terminal SCLK of the MCU 20 through the electrical contacts 1c and 2c, and 1-byte (8-bit) data is output bit by bit from the terminal SO of the MCU 20 in synchronism with this clock. The output signal is input to the serial input terminal SI of the MCU 10 through the electrical contacts 1d and 2d, and is transferred to the serial input/output register of the MCU 10 bit by bit from the LSB. In step 605, it is monitored if serial flag="1". The serial flag is set to be "0" when the serial clock is generated. The serial flag is switched to "1" when 8 pulses of the serial clock are counted. Therefore, if the serial flag is not "1", since serial transfer is not completed, the operation in step 605 is repeated. When the serial flag becomes "1", the flow advances to step 606. In step 606, data of the lens 2 (Table 2) transferred to the serial input/output register is transferred to a predetermined internal memory of the MCU 10, and the flow returns to the main routine. Thus, the subroutine operation is ended.

Figure 5:
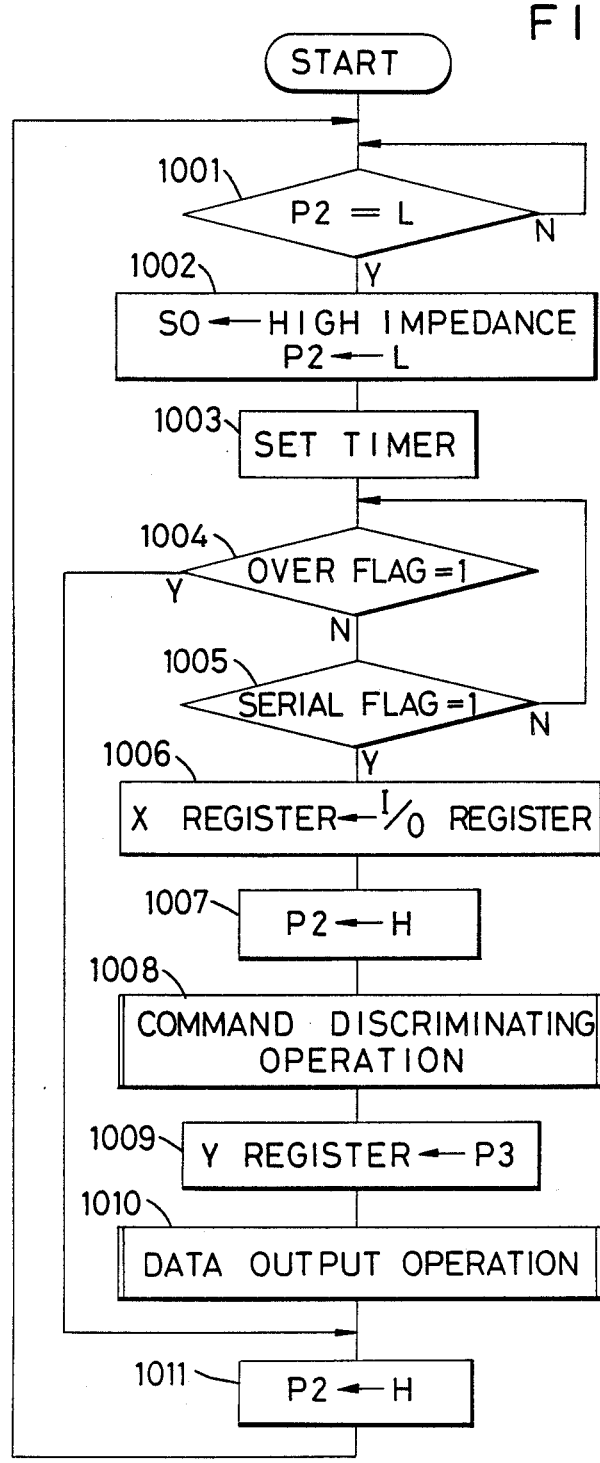
FIG. 5 is a flow chart of a main routine of an MCU 20.

FIG. 5 is a flow chart of the main routine of the MCU 20 of the lens 2 according to the first embodiment. In step 1001, it is monitored if the input of the input/output terminal P2 is at L level. The input/output terminal P2 is set in the input mode after power-on reset, and in step 1011, the terminal P2 is set at H level and in the input mode. In any case, when the operation of step 1011 is performed, the input/output terminal P2 is set in the input mode. When the MCU 10 requires data stored in the lens, it outputs a command corresponding to the required data through the terminal P1, as described above. Therefore, the output level of the terminal P1 is monitored by the input/output terminal P2 of the MCU 20 connected thereto through the electrical contacts 1b and 2b. If the terminal P1 is not set at L level, the input to the terminal P2 is always set at H level. Therefore, the operation of step 1001 is repeated. When the L-level output is generated from the terminal P1 of the MCU 10, the input of the terminal P2 is set at L level, and the flow advances to step 1002. In step 1002, the serial output terminal SO of the MCU 20 is set in the high-impedance state, so as not to influence the signal input to the serial input terminal SI of the MCU 20. The input/output terminal P2 is then set in the output mode (i.e., at L level), thereby informing the MCU 10 that the MCU 20 has completed preparation for data reception. In step 1003, the predetermined time tesc is set in a timer. The lapse of the predetermined time tesc can be detected by monitoring whether the timer over flag is "0" or "1". In step 1004, the timer over flag is monitored, and if the flag becomes "1" after the lapse of the predetermined time tesc, the flow jumps to step 1011. However, if the flag becomes "1" within the predetermined time, the flow advances to step 1005, and the serial flag is monitored. When the MCU 10 is formed that the MCU 20 has completed preparation for command reception in step 1002, the command data from the MCU 10 is transferred to the serial input terminal of the MCU 20 bit by bit from its LSB from the serial output terminal SO of the MCU 10 in synchronism with the serial clock from the serial clock terminal SCLK of the MCU 10. Thus, the command data is transferred to a serial input/output register of the MCU 20 bit by bit from its LSB in synchronism with the serial clock. When 8 serial clock pulses input to the serial clock terminal SCLK of the MCU 20 are counted, the serial flag is switched from "0" to "1", thus indicating completion of serial transfer. The flow then advances to step 1006. If 8 serial clock pulses cannot be input, since the serial flag is "0", the flow returns to step 1004. In step 1011, the input/output terminal P2 is set at H level (input mode), and the flow returns to step 1001. Then, the MCU 20 awaits until the MCU 10 enables the serial transfer data exchange operation. In step 1005, if the serial flag becomes "1" and the serial transfer is completed, the command data transferred from the MCU 10 is stored in the serial input/output register of the MCU 20 at that time. In step 1006, the command data stored in the serial input/output register is transferred to an X register in the MCU 20. In step 1007, the output of the terminal P2 is set from L level to H level, thereby indicating completion of command reception to the MCU 10. In step 1008, the MCU 20 calls the command discriminating operation subroutine shown in FIG. 6, in order to discriminate the received command data. The MCU 20 discriminates the command data sent from the MCU 10 in accordance with the command discriminating operation subroutine, and sets data according to Table 3 in an output enable state. In step 1009, inputs to the input terminals P30, P31, and P32 are transferred to a Y register. Note that the input terminals P30, P31, and P32 are called a terminal P3 hereinafter. The input to the terminal P3 varies in accordance with the zoom position, as shown in Table 1. In this case, values 0, 1, 3, 2, 6, 7, 5, and 4 are stored in the Y register in correspondence with the zoom positions 0, 1, 2, 3, 4, 5, 6, and 7, respectively. If a data output operation subroutine shown in FIG. 7 is called in step 1010, the data in the MCU 20 corresponding to the command from the MCU 10 set in step 1008 is serially output to the MCU 10 according to Table 3. As shown in Table 3, if the command is one of $00 to $FB, 1-byte data is sent back to the MCU 10. If the command is $FC, 2-byte data is sent back to the MCU 10. If the command consists of $FD and $FE, 8-byte data is sent back to the MCU 10. If the command is $FF, 16-byte data is sent back to the MCU 10. After the predetermined number of data is output, the flow advances to step 1011, and the output terminal P2 is set at H level (input mode). The flow then returns to step 1001, and awaits until the MCU 10 initiates the serial data exchange operation.

Figure 6:
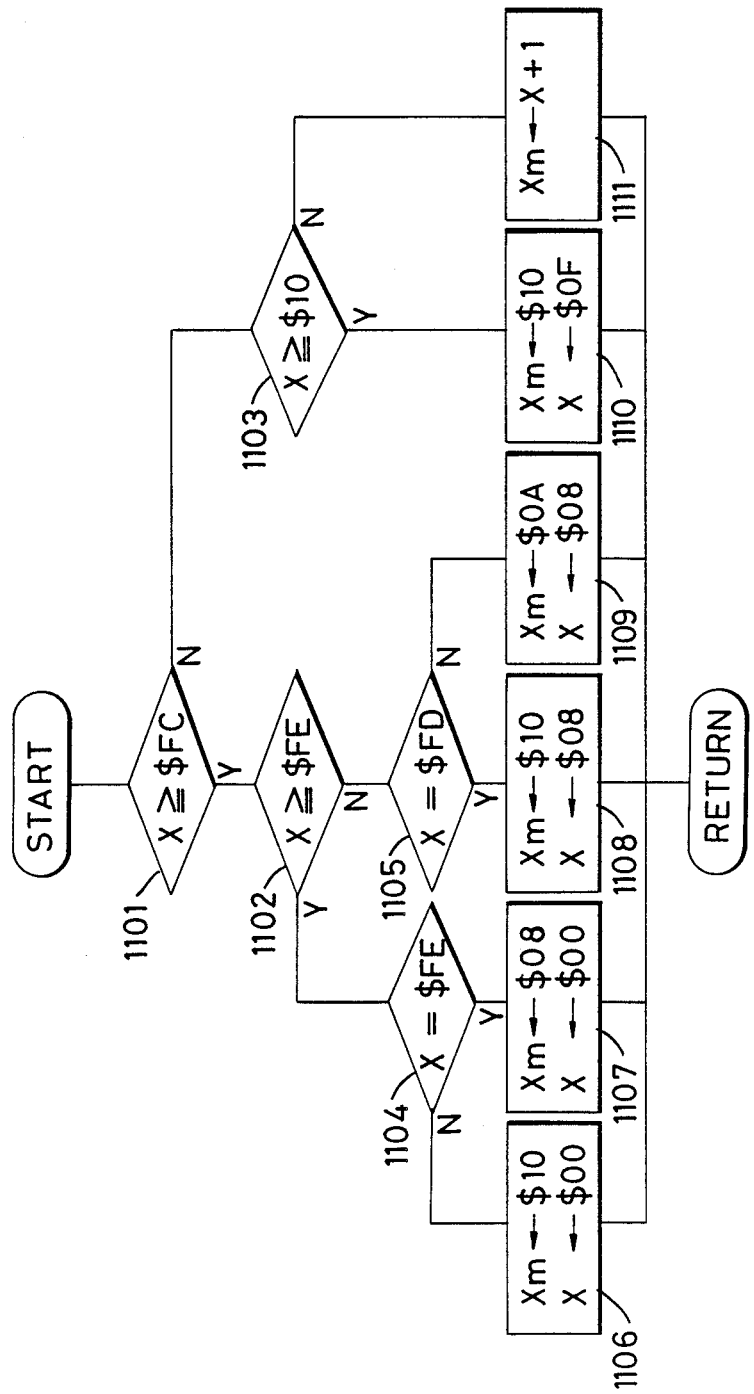
FIG. 6 is a flow chart of a command discrimination operation subroutine of the MCU 20.
Figure 7:
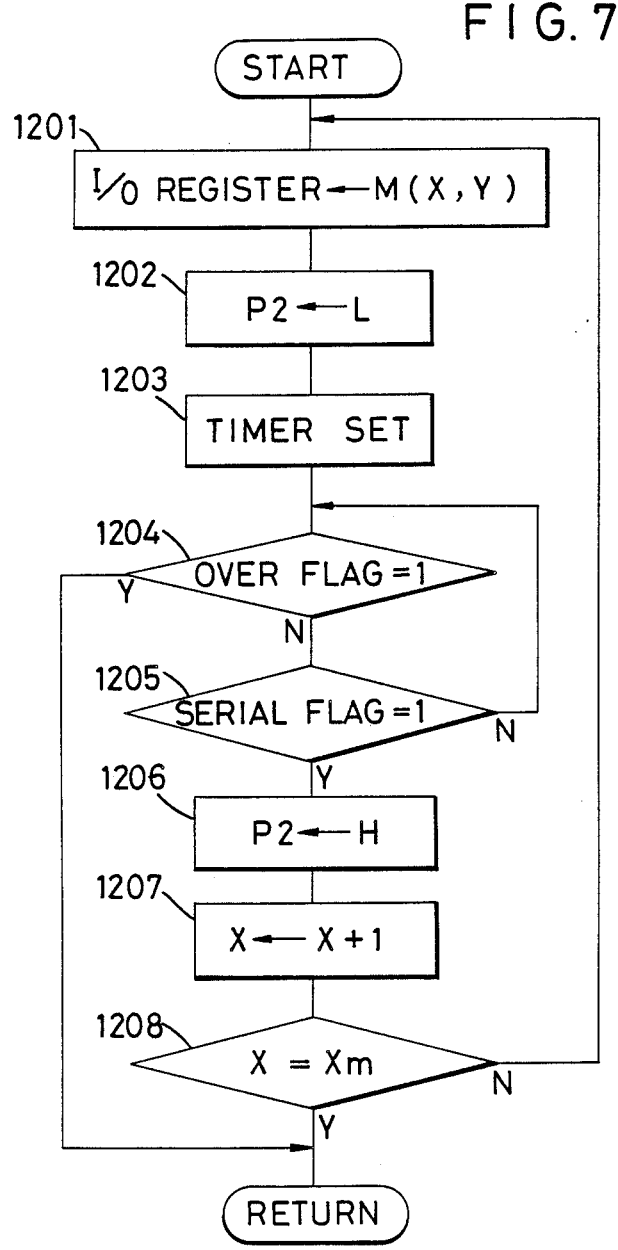
FIG. 7 is a flow chart of a data output operation subroutine of the MCU 20.

FIG. 6 is a flow chart of the command discriminating operation subroutine of the MCU 20 according to the first embodiment. In this flow chart, the X register is indicated by "X", and an Xm register is indicated by "Xm". In step 1101, the content of the X register is compared with $FC. At this time, the X register stores the command data. If the command data is equal to or larger than $FC, the flow advances to step 1102. If the command data is smaller than $FC, the flow advances to step 1103. In step 1102, the command data stored in the X register is compared with $FE. If it is determined in step 1102 that the command data is $FE or $FF larger than $FE, the flow advances to step 1104. In step 1104, the command data stored in the X register is compared with $FE. In step 1105, the command data stored in the X register is compared with $FD.

In step 1103, the command data stored in the X register is compared with $10.

If the command data is $FF, the flow advances to step 1106. In order to output 16-byte data from "X=0" to "X=F" in Table 2 according to Table 3, $00 as coordinate data of the start position is stored in the X register. After this subroutine is completed, 1-byte X-coordinate data stored in the X register is output in a data output operation subroutine in FIG. 7 (to be described later), thus incrementing the content of X register by one. This operation is repeated, and when the content of the X register coincides with that of the Xm register, the subroutine operation shown in FIG. 7 is completed without initiating the data output operation. Thus, in step 1106 in FIG. 6, $10 is set in the Xm register, and $00 is set in the X register. In this manner, the X and Xm registers are prepared for serially transferring 16-byte data from "X=0" to "X=F" in Table 2, i.e., data in all the areas set in the MCU 20, to the MCU 10.

In order to output data corresponding to Table 3 in steps 1107 to 1111, the X and Xm registers are set.

If the command data is $FE, the flow advances to step 1107. In this case, 8-byte data primarily associated with AE control from "X=0" to "X=7" in Table 2 is serially transferred to the MCU 10.

If the command data is $FD, the flow advances to step 1108. In this case, 8-byte data primarily associated with AF control from "X=8" to "X=F" in Table 2 is serially transferred to the MCU 10.

If the command is $FC, the flow advances to step 1109. In this case, the X and Xm registers are prepared for transferring 2-byte data of the conversion coefficients KD(1) and KD(2) of "X=8" and "X=9" in Table 2.

If the command data includes $10 and corresponds to $10 to $FB (including $FB), the flow advances to step 1110. As shown in Table 3, these commands have undefined contents for the MCU 20. In this case, in order to send back $FF as a default value to the MCU 10, a command of "X=F" storing $FF is derived instead, and $10 and $0F are respectively set in the Xm and X registers. In this manner, the X and Xm registers are prepared for serially transferring data $FF stored in the "X=F" coordinate of Table 2, to the MCU 10.

If the command data corresponds to one of $00 to $0F, the flow advances to step 1111. In this case, a value of X+1 is set in the Xm register, thereby serially transferring 1-byte data of the X-coordinate in Table 2 corresponding to the command data stored in the X register, to the MCU 10. In step 1111, the preparation operation can be completed by setting only the Xm register.

The X and Xm registers are set in any state of step 1106 to step 1111 in accordance with the content of the command data. The flow then returns to the main routine, and the subroutine operation shown in FIG. 6 is ended. In the data output operation subroutine executed thereafter, data between a position stored in the X register of the X-coordinate in Table 2 and a position smaller by one than a value stored in the Xm register are serially transferred from the MCU 20 to the MCU 10 byte by byte.

Figure 8:
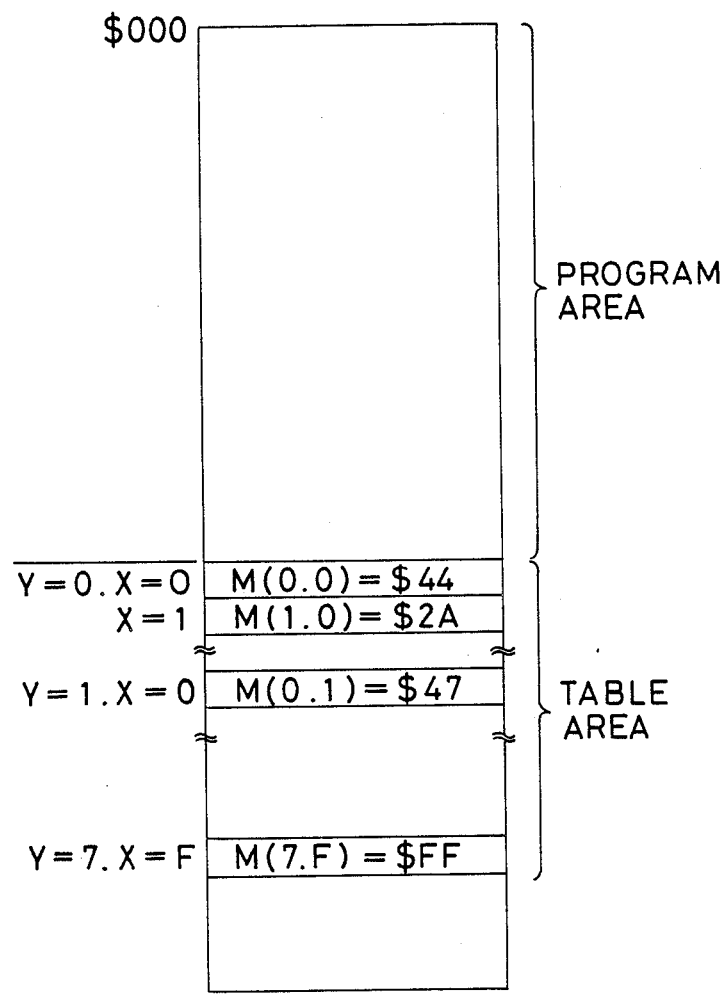
FIG. 8 is a ROM map of the MCU 20.

FIG. 7 is a flow chart of the data output operation subroutine of the MCU 20 according to the first embodiment. When this subroutine is called, data M(X,Y) corresponding to Table 2 and determined by the X and Y registers of the MCU 20 at that time is transferred to the serial input/output terminal of the MCU 20. The data stored in the MCU 20 can be represented in a matrix manner, as shown in Table 2. More specifically, the internal arrangement of the MCU 20 is as shown in FIG. 8. FIG. 8 shows the memory map of the ROM of the MCU 20. The ROM can be principally divided into two areas. One area is a program area, and stores commands for executing operations corresponding to the flow charts of the subroutines shown in FIGS. 6 and 7 from the main flow chart shown in FIG. 5. The other area is a table area and stores data corresponding to Table 2. A ROM corresponding to data M(X,Y) designated by the X and Y registers is shifted by the program area. The shifted position of the data table area is used as a start point thereof, and the data table area stores the data in Table 2 in the order of Y=0 to Y=7 for the Y-coordinate and in the order of X=0, X=1, . . ., X=F for the identical Y-coordinate. When the data in the MCU 20 is determined, as shown in Table 2, the table area stores data like M(0,0)=$44, M(1,0)=$2A, . . ., M(0,1)=$47, . . ., M(7,F)=$FF. Therefore, referring again to FIG. 7, data M(X,Y) is data to be transferred from the MCU 20 to the MCU 10 at this time. In step 1202, the input/output terminal P1 is set at L level, and this state is informed to the MCU 10. The operations from steps 1203 to 1205 are the same as those in steps 1003 to 1005 in FIG. 5.

If the terminal P1 is set at L level in step 1202, 8 serial clock pulses are generated from the serial clock terminal SCLK of the MCU 10, and are input to the serial clock terminal SCLK of the MCU 20 through the electrical contacts 1c and 2c. The data stored in M(X,Y) in the table area of the serial input/output register of the MCU 20 is output from the serial output terminal SO of the MCU 20 from its LSB in synchronism with the serial clock. When the 8 pulses are input to the serial clock terminal SCLK of the MCU 20, the serial flag is set to "1", and the flow advances to step 1206. However, if the flag is "0", the flow returns to step 1204. If the over flag is set to "1", the flow returns to the main routine, and the subroutine operation is ended.

The flow then advances to step 1011 in FIG. 5, and the input/output terminal P2 is set at H level (input mode). The flow returns to step 1001.

If the serial flag is set to "1", the flow advances to step 1206. The H-level signal is output to the input/output terminal P2 in step 1206, thereby informing to the MCU 10 that transfer of 1-byte data M(X,Y) is completed. In step 1207, a numerical value stored in the X register is incremented by one, and it is checked in step 1208 if the content of the X register coincides with that of the Xm register. The operations in steps 1201 to 1208 are repeated until the numerical value stored in the X register coincides with that stored in the Xm register, and if X=Xm is established, the data output operation subroutine is ended. Data corresponding to Table 3 can be output upon execution of this subroutine.

Figure 9:
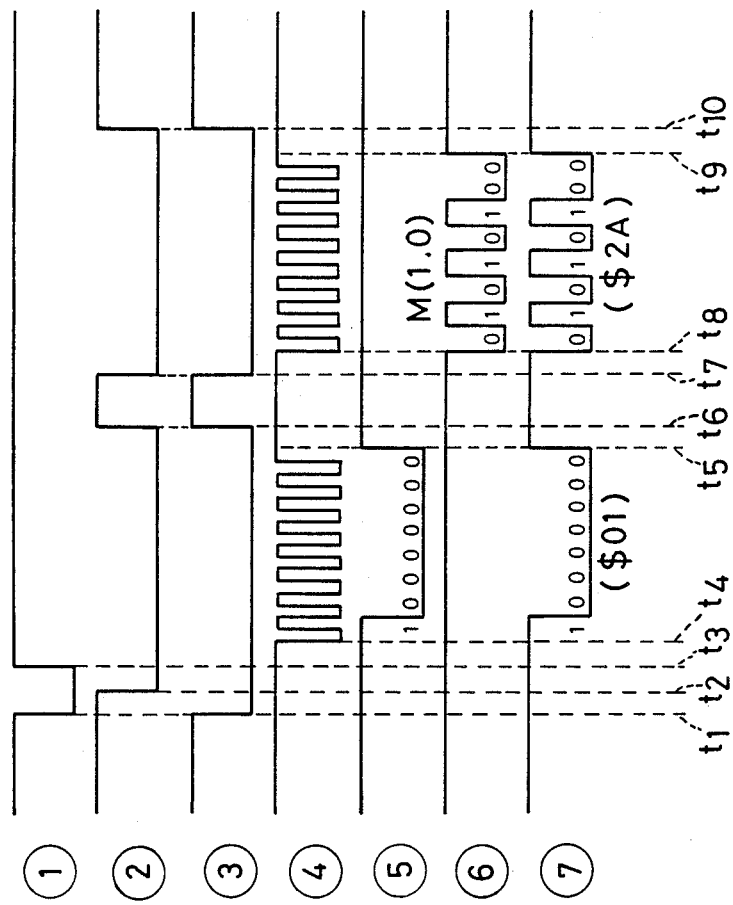
FIG. 9 is a timing chart corresponding to a command $01.

FIG. 9 is a timing chart corresponding to a case wherein the MCU 10 of the first embodiment executes the operations of steps 101 to 104 in the flow chart of the main routine shown in FIG. 2. Waveforms ① and ② correspond to outputs from the input/output terminals P1 and P2 of the MCUs 10 and 20, respectively. Both the terminals P1 and P2 are constituted by pull-up resistors and open drains in the ouput mode. When they are connected to each other through the electrical contacts 1b and 2b, the signals appearing at the terminals P1 and P2 are set at L level if one of the terminals P1 and P2 is set at L level, thus providing a composite output indicated by a waveform ③. Thus, an actual voltage at the terminals P1 and P2 has the waveform ③. A waveform ④ corresponds to the output waveform from the serial clock terminal SCLK of the MCU 10, and serves as a serial clock input to the MCU 20 when the terminal SCLK of the MCU 10 is connected to the terminal SCLK of the MCU 20 through the electrical contacts 1c and 2c. Waveforms ⑤ and ⑥ are output waveforms of the serial output terminals SO of the MCUs 10 and 20, respectively. Since the terminals SO are constituted by the pull-up resistors and the open drains, when they are connected through the electrical contacts 1d and 2d, a composite output indicated by a waveform ⑦ appears at each terminal SO. The outputs from the terminals SO are also connected to the serial input terminals SI of the MCUs 10 and 20, and serve as the serial inputs, respectively. Note that in the timings charts in FIG. 9 and the subsequent figures, waveforms ① to ⑦ indicate the same contents.

The MCU 10 stores $01 in a memory for storing the command data, in order to read the full-aperture value of the lens 2, in step 101 in FIG. 2, and calls the command output subroutine shown in FIG. 3 in step 102. The flow then advances to step 501, and the terminal P1 is set at L level, thereby initiating the serial data exchange operation (t=t1). In step 502, the command data $01 stored in step 101 is transferred to the serial input/output register of the MCU 10, a predetermined period of time is measured, and the input/output terminal P1 is set at H level (input mode) (t=t3). The MCU 10 monitors whether or not the input of the terminal P1 is set at L level within the predetermined time tesc and preparation for command reception from the MCU 20 is completed. The MCU 20 of the lens 2 repeats the operation of step 1001 in FIG. 5. When the terminal P1 of the MCU 10 is set at L level at a time of t=t1 and the serial data exchange operation is initiated, the input of the input/output terminal P2 of the MCU 20, which receives the waveform ③ set at L level. The flow then advances from step 1001 to step 1002, and the serial output terminal SO is set in the high-impedance state. Then, the terminal P2 is set at L level, thereby informing the MCU 10 that preparation for command reception is completed (t=t2). The MCU 20 monitors in step 1003 to step 1005 whether or not the serial flag is set to "1" and the serial transfer is completed within the predetermined time tesc. When the terminal P2 of the MCU 20 is set at L level at time t=t2, the MCU 10 sets the terminal P1 (①) at H level(t=t3), and monitors the waveform of the composite output ③. Thus, the flow can immediately advance from step 506 to step 507. When the MCU 10 starts generation of the serial clock in step 507 t=t4), the command data $01 is output from the LSB from the terminal SO (⑤) the MCU 10 in synchronism with the serial clock (④). Meanwhile, in the MCU 20, the command data $01 is transferred from the serial input terminal SI to the serial input/output register thereof from the LSB. When 8 pulses are input from the serial clock terminals SCLK of the MCU 10 to the serial clock terminal SCLK of the MCU 20 within the predetermined time tesc (t=t5), the serial flag of the MCU 20 is set to be "1", and the MCU 20 can advance the flow from step 1005 to step 1006. I step 1006, the MCU 20 transfers the command data stored in the serial input/output register to the X register thereof, and in step 1007, sets the output (②) of the terminal P2 at H level, thereby setting the composite output ③ at H level (t=t5). In step 1008, the MCU 20 calls the command discriminating operation subroutine shown in FIG. 6. If the command data is $01, the flow advances to steps 1101, 1103, and 1111, and the Xm register stores a value of X+1=$01+1=$02. Then, the subroutine operation is ended, and the flow advances to step 1009 in FIG. 5. If the zoom position is "0", all the inputs to terminals P32, P31, and P30 become "0", and "0"s are stored in the Y register in step 1009. When the data output operation subroutine shown in FIG. 7 is called in step 1010, the X register stores data $01, the Xm register stores data $02, and the Y register stores data $00 at this time. In step 1201, data $2A of M(1,0) is transferred to the serial input/output register of the MCU 20. If the output (②) at the terminal P2 is set at L level in step 1202, the composite output ③ also goes to L level (t=t7). At this time, the output preparation of the MCU 20 is completed. The flow then advances to step 1203, and the predetermined time tesc is set in the timer. As described above, the MCU 20 repeats the operations of steps 1204 and 1205 within the limit time tesc. Meanwhile, the MCU 10 causes the flow to advance from step 507 to step 508 in FIG. 3, measures a predetermined time, and completes the command output operation subroutine shown in FIG. 3 while the error flag is "0". Then, the flow advances from step 102 to step 104 of the main flow chart in FIG. 2, and the data input operation subroutine shown in FIG. 4 is called. When the flow enters the subroutine shown in FIG. 4, the predetermined time tesc is set in the timer in step 601, and the operations of steps 602 and 603 are repeated within the predetermined time tesc, as described above, thereby monitoring whether or not the composite output ③ input to the terminal P2 goes to L level. At time t=t7, the composite output ③ goes to L level, and the MCU 10 advances the flow from step 603 to step 604. In step 604, the serial output terminal SO of the MCU 10 is set in the high-impedance state, so as to initiate the serial clock generation (t=t8). Then, the data $2A of M(1,0) stored in the serial input/output register of the MCU 20 is input from its LSB from the serial output terminal SO of the MCU 20 to the serial input terminal SI of the MCU 10 through the electrical contacts 1d and 2d in synchronism with the serial clock ④ of the MCU 10. Thus, the command data is stored in the serial input/output register of the MCU 10 from the LSB bit by bit. When 8 clock pulses are input from the serial clock terminal SCLK of the MCU 10 to the serial clock terminal SCLK of the MCU 20 (t=t9), the serial flag of the MCU 20 is set to "1", and the MCU 20 causes the flow to advance from step 1205 to step 1206, thereby setting the terminal P2 at H level (t=t10). If a numerical value stored in the X register is updated from "1" to "2" in step 1207, since "2" is stored in the Xm register, the flow returns to the main routine based on the comparison result obtained in step 1208. Thus, the data output operation subroutine shown in FIG. 7 is completed. The MCU 20 causes the flow to advance from step 1010 to step 1011 in the flow chart of the main routine shown in FIG. 5, and sets the input/output terminal P2 at H level (since it has already been set at H level, the waveforms ② and ③ are left unchanged), thereby setting the input mode. The flow returns to step 1001, and the MCU 20 awaits until the MCU 10 initiates the serial data exchange operation. The MCU 10 repeats the operation in step 605 shown in FIG. 4 until the serial flag of the MCU 10 is set to "1". Thus, at time t=t9 when the 8 serial clock pulses are output, the serial flag is set to "1", and the flow can advance to step 606. At this time, since data $2A is stored in the serial input/output register of the MCU 10, the data $2A stored can be transferred to a predetermined memory in step 606. The flow returns to the main routine while the error flag is "0", and the subroutine operation is ended. Then, the flow can advance from step 104 to step 105 in the main flow chart of the MCU 10 shown in FIG. 2, and can advance from step 105 to step 107.

In step 107, aperture display in the shutter priority mode (S mode) is made using the received full-aperture value AV0 data $2A. When the aperture value AVs to be controlled is obtained from the stopped-down-aperture value difference (AVs−AV0) controlled in the S mode, a value of (AVs−AV0) obtained by the MCU 10 of the camera body 1 can be added to data $2A of the full-aperture value (AV0) received from the MCU 20 of the lens 2. For example, if the value of (AVs−AV0) corresponds to 2.5 ($1E; 30 in decimal notation; if one aperture value difference consists of 12 steps), AVs=(AVs−AV0)+AV0=$1E+$2A=$48 Since $48 is 72 in decimal notation, if one aperture value difference consists of 12 steps, this value corresponds to AV6 or F8, and "F8" is displayed.

Figure 10:
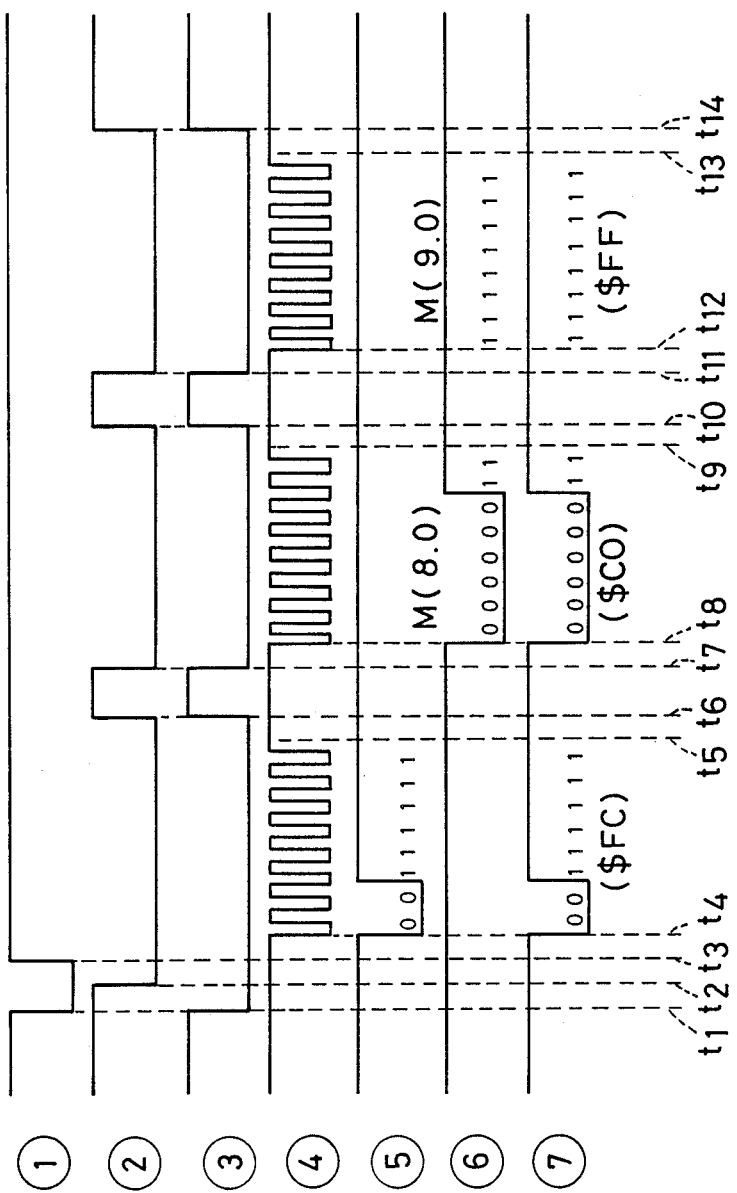
FIG. 10 is a timing chart corresponding to a command $FC.

FIG. 10 is a timing chart for executing the operations of steps 111 to 116 in the flow chart of the main routine of the MCU 10 shown in FIG. 2. The differences between the timings charts in FIGS. 9 and 10 are the command data and data read out from the MCU 20. However, the basic operation is the same as that in FIG. 9, and a detailed description thereof will be omitted.

After 8 serial clock pulses are input, the serial transfer is completed at time t=t13, and the output from the terminal P2 goes from L level to H level at time t=t14. After the MCU 10 executes the data input operation subroutine in step 114, the flow advances to step 116, and the AF operation is performed. The MCU 10 calculates the defocusing amount in accordance with the output from the focus detection part 12, and controls the output to the motor driver 13 in accordance with the conversion coefficients KD(1) and KD(2). Upon meshing of the coupler 15 of the camera body 1 with the coupler 22 of the lens 2, the optical system 21 of the lens 2 can be moved to an optimal position, and an object image is focused on the focal plane (not shown) of the camera body 1. In this manner, in steps 113 and 115, the conversion coefficients KD(1) and KD(2) are transferred to the MCU 10.

FIG. 11A is a timing chart when no response is sent back from the MCU 20 during execution of the command output operation subroutine by the MCU 10 of the first embodiment. Waveforms ①, ②, and ③ are the same as those in the timing chart shown in FIG. 9. When the MCU 10 sets the input/output terminal P1 at L level in step 501 in FIG. 3 to enable the serial data exchange operation with the MCU 20 (t=t1), the MCU 10 sets the command data in step 502, and measures the predetermined time in step 503. Then, the MCU 10 sets the terminal P1 at H level in the same manner as in FIG. 9 (t=t3). In step 504, the predetermined time tesc is set in the timer, and monitors whether or not the input indicated by the waveform ③ at the terminal P1 goes to L level by a response from the MCU 20, while the operations in steps 505 and 506 are repeated. If the input indicated by the waveform ③ does not go to L level, the MCU 10 repeats the operations in steps 505 and 506 for the predetermined time tesc. After the lapse of the time tesc (t=tY), the timer over flag of the MCU 10 is set to "1", and the flow jumps from step 505 to step 509 to set the error flag. Thus, the subroutine operation in FIG. 3 is ended. When the flow returns to the main routine shown in FIG. 2, the error flag is discriminated in step 103. In this case, since the error flag is "1", the flow jumps to step 106, and an error is displayed. For example, "F—" is displayed.

When the command output operation in step 102 in FIG. 2 is performed without error, the data input operation in step 104 can be performed without error at high probability. More specifically, if a special-purpose lens incorporating the MCU 20 is not attached to the camera body, this can be discriminated in step 103. Nevertheless, an error may occur when the electrical contacts and the like fail to operate or when a timing during serial data transfer is shifted. FIG. 11B shows the timing chart when no response is sent back from the MCU 20 during execution of the data input operation subroutine by the MCU 10. The MCU 10 measures a predetermined time required for discriminating the command by the MCU 20 in step 508 of the command output operation subroutine in FIG. 3. Thereafter, the flow returns to the main routine (t=t7'). Subsequently, the MCU 10 executes the data input operation subroutine shown in FIG. 4. In step 601, the predetermined time tesc is set in the timer, and the operations in steps 602 and 603 are repeated, thereby monitoring whether or not the input indicated by the waveform ③ input to the terminal P1 goes to L level. If no response is sent back from the MCU 20, the operations in steps 602 and 603 are idly repeated, and the timer over flag of the MCU 10 is set to "1" (t=tY') after the lapse of the time tesc. The flow then jumps from step 602 to step 607, and the error flag is set. Thereafter, the flow returns to the main routine. When the flow returns to step 104 in FIG. 2, the error flag is detected in step 105, and the flow advances to step 106, thereby performing an error display.

In this embodiment, once command or data exchange is unsuccessful, the error display is made for the sake of simplicity. However, if the data exchange is unsuccessful once, after the error display need not be made, but if a plurality of times of data exchange are performed the data exchange is still unsuccessful, the error display can then be made.

FIG. 12 is a timing chart when serial data exchange is enabled by the MCU 10, and another sequence is executed from the MCU 10 during command data transfer. Waveforms ① to ⑦ are the same as those in FIG. 9, and control progresses through the identical sequence to, e.g., a time t=tx.

If the MCU 10 enters a release sequence at time t=tx to perform another operation, since the 8 serial clock pulse transfer cannot be completed, the timer over flag of the MCU 20 is set to "1". The flow then jumps from step 1004 to step 1011, and the input/output terminal P2 is set at H level to set the input mode (t=tY). The flow then returns to step 1001, and awaits until the MCU 10 enables the serial data exchange operation. When the MCU 10 completes the release sequence and initiates again the serial data exchange operation with the MCU 20, the MCU 20 can respond to this.

Although a timing chart is omitted, when the MCU 10 enters another sequence during execution of the data output operation subroutine shown in FIG. 7 by the MCU 20, the flow can escape from the closed loop for waiting until the serial flag is set to "1" after the predetermined time tesc.

When the operation in the timing chart shown in FIG. 10 is executed, even if a trouble occurs caused by the MCU 10, MCU 20, or the contacts therebetween, the flow can escape from the closed loop in the same manner as in FIGS. 11A, 11B, and 12.

FIG. 13 is a flow chart of a main routine of an MCU 10 according to a second embodiment of the present invention. A camera system of this embodiment has the same arrangement as in the block diagram shown in FIG. 1, and the processing contents of an MCU 20 of a lens 2 are the same as those in the first embodiment. In this embodiment, the MCU 10 has a sufficient RAM area, and data in all the memory areas in the lens can be read once. A camera body 1 has multi-functions for sufficiently utilizing the data.

In step 201 in FIG. 13, $FF is set as command data, and in step 202, a command output operation subroutine is called. In this embodiment, this subroutine is the same as the command output operation subroutine shown in FIG. 3. Therefore, the command data $FF is transferred to the MCU 20 in the same manner as in a time interval from t=t1 to t=t5 in FIG. 9. The MCU 20 of the lens 2 sets data $10 in an Xm register and data $00 in an X register in step 1106 upon execution of the command discriminating operation subroutine shown in FIG. 6. In step 204, the MCU 10 calls the data input operation subroutine. Since data $00 is set in the X register of the MCU 20, if the zoom position corresponds to "0", Y=0 is given, and data of M(0,0) i.e., data $44 in Table 2 is transferred from the MCU 20 to the MCU 10 in the same manner as in a time interval from t=t7 to t=t10 in FIG. 10, and is stored in a predetermined memory of the MCU 10. The MCU 10 stores data $44, which is stored in the predetermined memory upon execution of the data input operation subroutine, in a memory area M(X) designated by the X register of the MCU 10, in step 205. At this time, since X=0, the data $44 is stored in a memory area M(0). Then, a numerical value stored in the X register is incremented by one. At this time, the content of the X register is changed from X=0 to X=1. Then, it is checked in step 206 if a numerical value stored in the X register reaches $10. If a coincidence is found between the numerical value and the content of the X register, the flow advances to the next step. However, if the numerical value is smaller than data $10, the flow returns to step 204. At this time, since X=1, the flow returns to step 204. In step 204, the data input operation subroutine shown in FIG. 4 is called, and the next data is read from the MCU 20.

Steps 204, 205, and 206 are repetitively executed until X=$10. When X=$10, the flow escapes from the closed loop. During this interval, if the zoom position is "0" and the content of the Y register corresponds to "0", data M(0,0), M(1,0), M(2,0), . . ., M($F,0) output from the MCU 20 are stored in memory areas M(0), M(1), M(2), . . ., M($F). The MCU 10 receives 16-byte data stored in the MCU 20, and executes various functions, while the MCU 20 awaits until the MCU 10 initiates the next operation. An advantage of a method in which the MCU 10 reads data from a lens, as shown in FIG. 13, is that 16-byte data can be sequentially sent from the MCU 20 to the MCU 10 by sending 1-byte command data from the MCU 10 to the MCU 20.

Figure 14:
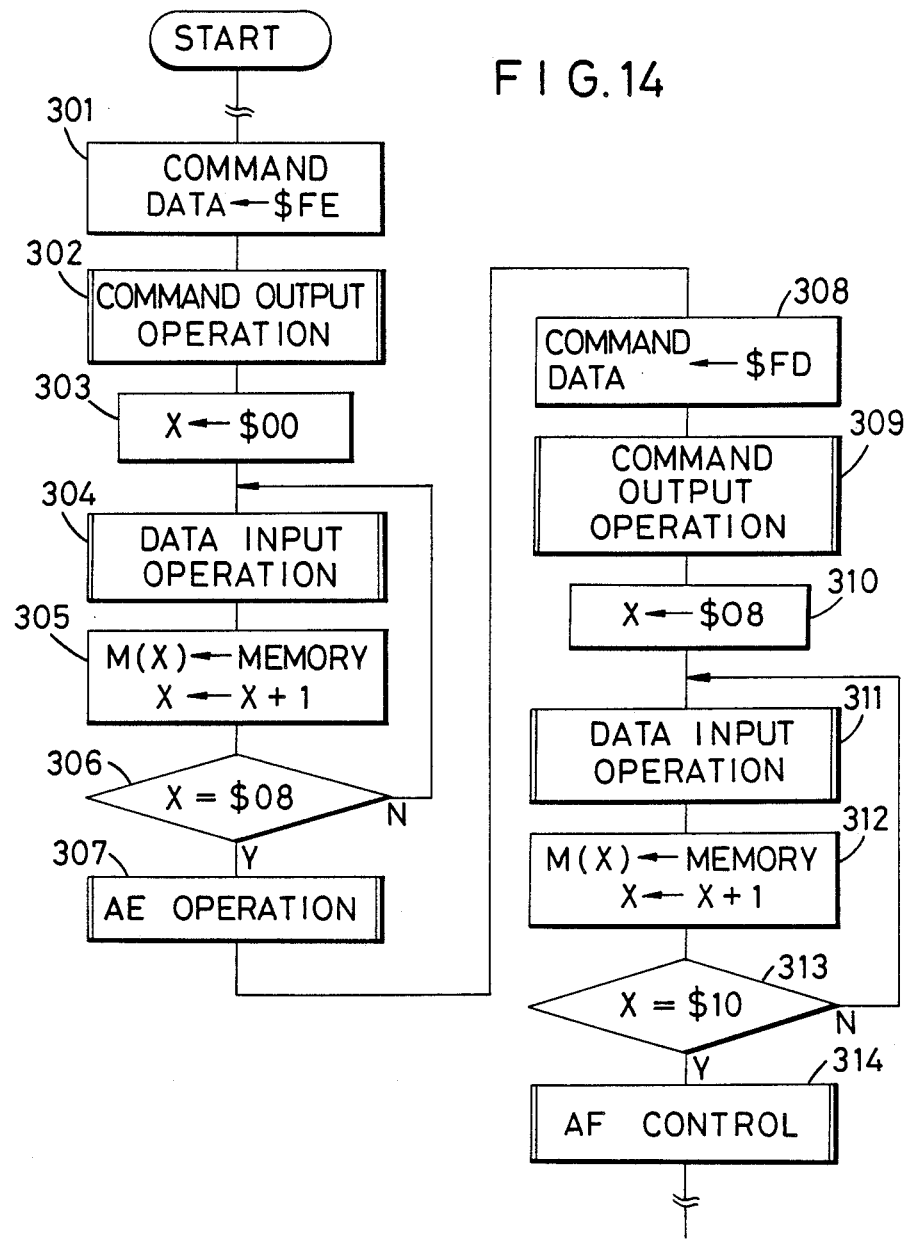

FIG. 14 is a flow chart of a main routine of an MCU 10 according to a third embodiment of the present invention. The arrangement of a system of this embodiment is the same as that shown in the block diagram of FIG. 1, and the arrangement of a lens 2 is the same as that in the first embodiment. In this embodiment, data $FE and data $FD are used as command data, 8-byte data primarily associated with AE is read so as to perform an AE operation, and 8-byte data primarily associated with AF is read to perform AF control. Step 301 to step 307 in FIG. 14 correspond to the AE operation blocks, and step 308 to step 314 in FIG. 14 correspond to the AF control blocks. The control sequences of these operations are basically the same as those in the flow chart shown in FIG. 12 or in the timing chart shown in FIG. 13, and differences between the previous and third embodiments are start and end points of data to be transferred due to difference in commands. When the MCU 10 transfers the command $FE in steps 301 and 302, an MCU 20 stores data $08 in the Xm register in step 1107 and data $00 in the X register in step 1107 in the command discriminating operation subroutine shown in FIG. 6, and 8-byte data M(0,Y), M(1,Y), . . ., M(7,Y) are allowed to output through the data output operation subroutine shown in FIG. 7. The MCU 10 stores data $00 in the X register in step 303, and repeats the operation of step 304 eight times while performing discrimination in step 306. The MCU 10 then stores data M(0,Y), M(1,Y), . . ., M(7,Y) stored in the MCU 20 in memory areas M(0), M(1), . . ., M(7) thereof. In step 307, AE display and various setting operations for a release sequence are performed based on the 8-byte data received from the MCU 20.

From step 308, the operation associated with AF control starts. When the MCU 10 sends a command $FD upon execution of steps 308 and 307, the MCU 20 is allowed to output 8-byte data M(8,Y), M(9,Y), . . ., M(F,Y) in correspondence with the command data $FD. The MCU 10 sets data $08 in the X register thereof, and stores data M(8,Y) stored in the MCU 20 in a memory M(8) thereof through the operations from step 311 to step 313. The MCU 10 then repeats steps 311 to step 313, and when the last data M(F,Y) in MCU 20 is stored in a memory M(F) of the MCU 10, the flow advances from step 313 to 314. The AF control in step 314 of FIG. 14 is basically the same as in step 116 in FIG. 2. In this case, a data volume read by the MCU 10 is increased more than that in the first embodiment (in this embodiment, aberration data is read), and highly precise control can be performed.

The MCU 10 does not always require all 8-byte or 16-byte data sent from the MCU 20 in response to the command $FD, $FE, or $FF. For example, data stored in M(8,Y), M(9,Y), M(A,Y), M(B,Y), M(C,Y), M(D,Y), M(E,Y), and M(F,Y) of the MCU 20 are sent out in response to the command $FD. In this case, as shown in Table 2, the MCU 10 does not particularly require data whose X-coordinate belongs to C to F. In this case, in step 313 in FIG. 14, the content of the X register is compared with $0C. Thus, if data stored in the 4th byte M(B,Y) is received, data $0C is set in the X register in step 312, and the flow can advance to step 314. The MCU 20 causes the flow to return from step 1208 to 1201 in FIG. 7, and enables storage data to be output. Thereafter, in step 1204 and 1205, the MCU 20 awaits until the serial flag is set to be "1". In this case, since the MCU 10 supplies no serial clock input, the flow escapes from the closed loop after the lapse of the predetermined time tesc, and the MCU 20 awaits until the MCU 10 enables the next serial data exchange operation. The MCU 20 is arranged to escape from the closed loop after the time tesc has passed, as described with reference to FIG. 12. Therefore, the MCU 10 can improve access speed. This also applies to commands $FE and $FF, as a matter of course.

A case will be considered wherein an undefined command $12 is sent from the MCU 10 in the first embodiment or other MCUs to the MCU 20. If the command is $12, the X-coordinate in Table 2 in which data $FF is stored is converted to "F" in step 1110 in the command discriminating operation subroutine in FIG. 6. Therefore, $FF stored in the memory area M(F,0) is output as data. If a lens having functions superior to those of the lens 2 incorporating the MCU 20 is to be designed, the content corresponding to the numerical value of data $FF is determined to correspond to this MCU 20. Alternatively, data $FF is treated as insignificant data, so that data $00 to $FE responsive to the command $12 can be used as significant data. If the content corresponding to the command $12 causes sending back a plurality of data or performance of other operations, it is checked whether or not the 1st byte data to be sent back in response to data $12 is data $FF, thereby discriminating whether or not the lens can cope with the command $12. Thus, the MCU 10 can terminate a read operation of the 2nd byte and subsequent data or can terminate the operation set by the command $12. In the above description, the command $12 has been exemplified as the undefined command. This also applies to $10 to $FB shown in Table 3.

FIG. 15 is a block diagram of a fourth embodiment of the present invention. The block diagram in FIG. 15 illustrates a partial modification of that in FIG. 1, and is partially omitted. The serial output terminal SO in the camera body 1 shown in FIG. 1 is omitted from a camera body 1', and an MCU 10' executes the same operations as the MCU 10 in the second embodiment shown in FIG. 13. In the MCU 10 of the second embodiment, the serial output terminal SO is used only when the command $FF is output. If the serial input terminal SI is pulled up, the same result can be obtained. Therefore, the serial output terminal SO of the MCU 10 is omitted. Therefore, the serial output terminal SO of the MCU 10' can be used for other operations. A difference between lenses 2 and 2' is that an interrupt input terminal INT of the MCU 20 is connected to the electrical contact 2b. In this case, a terminal P2 can be used as only an output terminal. The MCU 20' of the lens 2' executes the flow charts of a main routine shown in FIGS. 16A and 16B. The MCU 20' has at least data memory areas M(0), M(1), M(2), ..., M(F) for storing data corresponding to 0 to F of the X-coordinate in Table 2 in its RAM area. The MCU 20' discriminates a zoom position upon execution of the main routine, and writes data corresponding to Table 2 in the memory areas M(0) to M(F) in accordance with the discriminated zoom position. Therefore, all the data in Table 2 need not be stored. In the main routine, data stored in the memory areas M(0) to M(F) are always rewritten in accordance with the zoom position The MCU 20 in the first embodiment awaits until the MCU 10 initiates the serial data exchange operation, while checking whether or not the terminal P2 is set at L level. In this embodiment, this operation is performed using the interrupt input terminal INT. When the MCU 10' initiates the serial data exchange operation, sets the terminal P1 at L level to set the electrical contacts 1b and 2b at L level, and the interrupt input terminal INT of the MCU 20' is set at L level, the MCU 20' calls a serial data operation subroutine by checking the interrupt flag in the main routine or by the interrupt operation in FIG. 16C. The serial data operation subroutine in step 2018 corresponds to the subroutine shown in FIG. 5, excluding step 1001 and step 1009. The subroutine shown in step 1010 of FIG. 5 is slightly different from this embodiment. In step 1010 in FIG. 5, of this embodiment, a memory area M(X) is used instead of the memory area M(X,Y) in step 1201 of FIG. 7.

Referring to FIG. 15, the lens 2' of the fourth embodiment is combined with the camera body 1' of the fourth embodiment. However, various combinations can be performed through the electrical contacts 1a to 1e and 2a to 2e having the command positional relationship in addition to the combination of the camera body 1 and the lens 2 shown in the first to third embodiments. The operation of the MCU 20' when it is combined with the MCU 10 in the first to third embodiments will be described below.

Figure 16A:
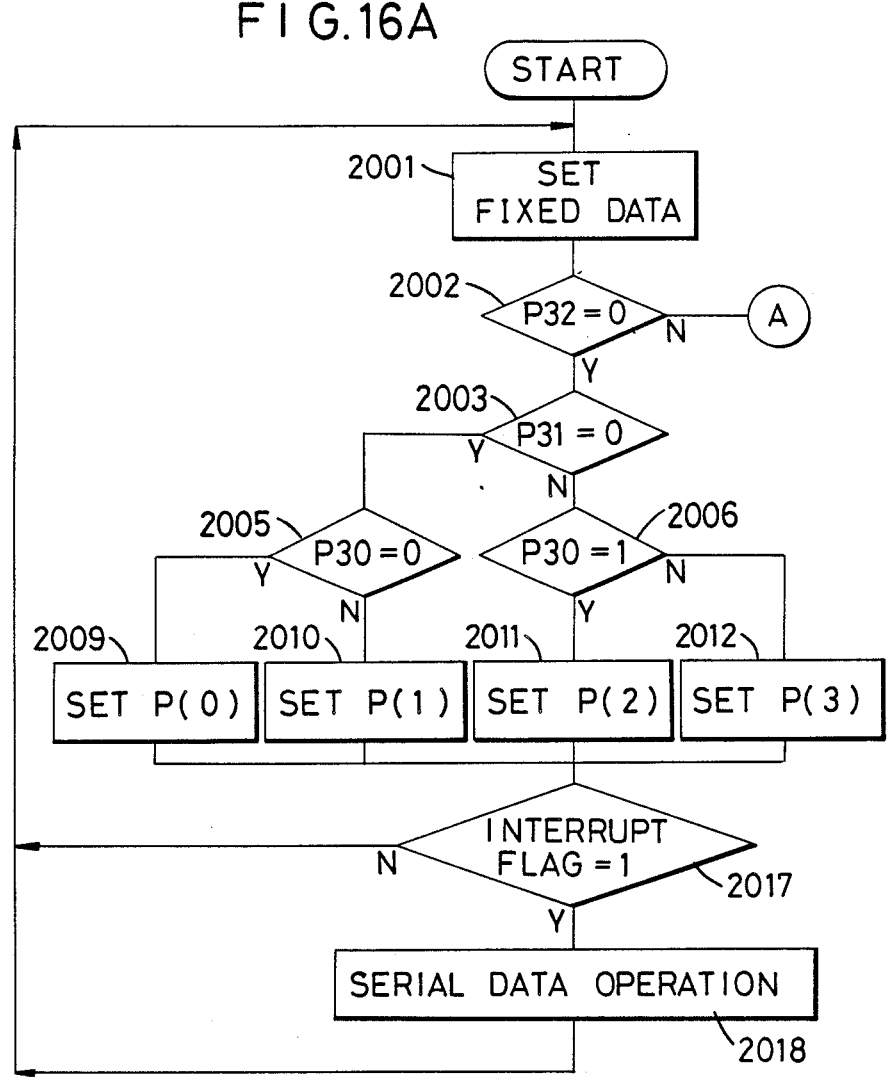

Steps 2001 to 2016 in FIG. 16A correspond to step 1009 in FIG. 5. More specifically, in the case of FIG. 5, the zoom position data input at terminals P32 to P30 can only be stored in the Y register. In step 2001 of FIG. 16A, fixed data in Table 2 which does not change depending on the zoom position is set in the RAM area of the MCU 20', and in step 2002 to step 2016, data P(n) (n=0, 1, ..., 7) which changes depending on the zoom position, and is input at the terminals P32 to P30 is set in the RAM area of the MCU 20' in accordance with the zoom position. Note that n corresponds to the RAM area of the MCU 20'.

The fixed data set in step 2001 corresponds to data $05 of the X-coordinate "2" to data $34 of the X-coordinate "7", and is stored in the memory areas M(2) to M(7) of the RAM area of the MCU 20'. Data $C0 of the X coordinate "B" in Table 2 to data $FF of the X coordinate "F" is stored in the memory areas M(B) to M(F). Step 2002 to step 2008 are branched in accordance with logic level "1" or "0" of terminals P32 to P30, which is changed in accordance with the zoom position, and advance any of step 2009 to step 2016. Thus, variable data according to the zoom position is set.

Data whose X-coordinate is "0", "1" or "8" to "A" changes depending on the zoom position. If the zoom position is "0", data $44 of the X-coordinate "0" and data $2A of the X-coordinate "1" are respectively stored in the memory areas M(0) and M(1) of the RAM area of the MCU 20', and data $C0, $FF, and $10 of the X-coordinates "8", "9", and "A" are respectively stored in the memory areas M(8), M(9), and M(A) of the RAM area of the MCU 20'. Thus, interrupt inhibition is canceled.

Through the above operation, data to be output from all the areas of the MCU 20' to the MCU 10 of the camera body 1 or 1' at the zoom position 0 are stored in the memory areas M(0) to M(F) of the MCU 20'. The same operation is performed at respective zoom positions.

As described above, data is set in the memory areas M(0) to M(F) of the RAM area of the MCU 20' in accordance with the zoom position, and the flow advances to step 2017. It is checked in step 2017 if the interrupt flag of the MCU 20' is "1". If the flag is "1", the flow advances to step 2018, and the MCU 20' calls the serial data operation subroutine. If the interrupt flag is "0", the flow returns to step 2001, and data is subsequently updated in accordance with the zoom position. The reason why the interrupt flag is checked in step 2017 is as follows. During 5-byte variable data storage in step 2009 to step 2016, the interrupt operation is inhibited. Therefore, even if the MCU 10 initiates the serial data operation, the electrical contacts 1b and 2b are set at L level, and an interrupt signal is supplied to the input terminal INT of the MCU 20', this interrupt signal cannot be accepted. For this reason, if an interrupt operation is performed during this interval, this is discriminated by checking in step 2017 that the interrupt flag is "1", and the flow enters the serial data operation subroutine in step 2018. FIG. 16C is a flow chart of the interrupt operation of the MCU 20'. In a state wherein the interrupt operation described above is not inhibited, when the MCU 10 initiates the serial data operation and the interrupt input terminal INT goes to L level, the MCU 20' immediately calls the serial data operation subroutine. The interrupt flag is set to "0" after the power-on reset of the MCU 20', is set to "1" when the interrupt input terminal INT goes to L level, and is set to "0" when the flag is checked in step 2017. The reason why the interrupt operation is inhibited during the setting operation of variable data in step 2009 to step 2016 is as follows. When the interrupt is made during this operation, if the zoom ring is being moved, the previously stored data may have a different zoom position from that in the data which is being set, and the troubles described in association with Table 4 will occur.

When the MCU 20' is arranged as described above, it can provide the same function as that of the MCU 20. When the MCU 20' is combined with the camera body 1 shown in FIG. 1 or the camera body 1' shown in FIG. 15, data is output as shown in the flow charts shown in FIGS. 9, 10, 11A, 11B, and 12. Data stored in the memory area M(X,Y) of the ROM of the MCU 20 shown in these figures corresponds to data stored in the memory area M(X) in the RAM of the MCU 20'. In this case, numerical values stored therein are identical, since the MCUs 20 and 20' are arranged as described above. Since the MCU 20' inhibits the interrupt operation during the setting operation of variable data shown in FIGS. 16A and 16B, it cannot often immediately respond to initiation of the serial data exchange operation by the MCU 10. However, a predetermined period of time is taken in step 503 or 504 in FIG. 3, resulting in no problem.

In the MCU 20', the fixed data can be commonly processed, and variable data is independently written unlike in the MCU 20. Therefore, the volume of data prestored in the ROM of the MCU 20' can be reduced. A load on the MCU 20' is reduced. Thus, identical MCUs are arranged in a plurality of types of lenses, and are identified using a lens ID switch so as to serve as different MCUs.

The movement of the preset aperture ring 23 of the lens 2 and the ring-shaped aperture interlock lever 17 will be described with reference to FIGS. 17A to 17D. FIG. 17A shows a lens mount surface of the camera body 1 while a lens is removed. The aperture interlock lever 17 is arranged on the outer periphery of a bayonet mount, is rotatable in the circumferential direction of the lens optical axis, and is biased by a spring (not shown). Therefore, a projection 23a (FIG. 1) of the preset aperture ring 23 is always engaged with a projection 17a of the aperture interlock lever 17, and they are moved together. Note that the electrical contacts 1a to 1e are substantially concentrically arranged inside the bayonet mount.

Figure 17B:
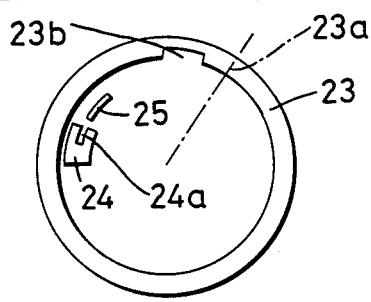

FIG. 17B shows the movement of the preset aperture ring of the lens 2. The position of projection 23a interlocked with the projection 17a of the aperture interlock lever shown in FIG. 17A is indicated by an alternate long and short dashed line. A which lock member 24 which is arranged on the lens 2 and is biased by a spring (not shown) in an outer peripheral direction for locking a notch 23b, when the preset aperture ring 23 is located at a minimum aperture position (corresponding to a minimum aperture). However, the notch 23b is not locked when the ring 23 is not located at the minimum aperture position, as shown in FIG. 17B. A member 25 interferes with the movement of the lock member 24. In a state wherein the member 25 interferes with the lock member 24, it is engaged with a notch 24a of the lock member 24, and even if the preset aperture ring 23 is located at the minimum aperture position, the member 25 can prevent the preset aperture ring 23 from being locked by the lock member 24. The member 25 shown in FIG. 17B does not prevent the lock member 24.

Figure 17C:
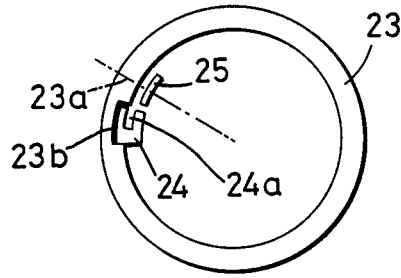

FIG. 17C shows a state wherein the preset aperture ring 23 is located at the minimum aperture position, and the lock member is engaged with the notch 23b of the preset aperture ring to lock it. In a P or S mode, a camera system is normally used in this state.

Figure 17D:
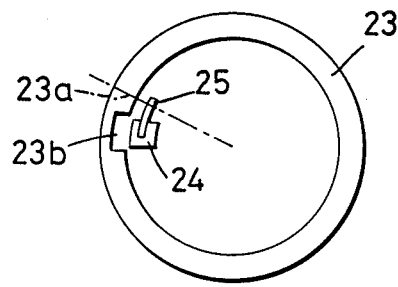

FIG. 17D shows a state wherein the member 25 prevents the movement of the lock member 24, so that the member 25 is engaged with the notch 24a of the lock member 24, and even if the preset aperture ring 23 of the lens 2 is located at the minimum aperture position, the preset aperture ring is not locked. When an imaging operation is accidentally performed at the minimum aperture position as in an aperture priority mode or a manual photographing mode, it is preferable that the ring 23 is not locked. In such a case, the member 25 can lock the lock member 24.

FIG. 18 is part of the flow chart of the MCU 10 of the camera body 1, and shows a routine for performing a warning display of an aperture setting error in the P and S modes. In the AE control mode for automatically controlling the aperture as in the P and S modes, the preset aperture ring must be set at the minimum aperture position so as to widen an effective aperture range. In the flow chart of FIG. 18, it is checked if the preset aperture ring is set at the minimum aperture position, and if not set, a warning display is made.

In step 71, as pre-processing for reading the maximum stopped-down-aperture value difference $(AV-AV0)_{MAX}$, command data $03 is set in a predetermined memory area, and the flow enters a serial input-/output operation subroutine in step 72. Thus, the data indicating the maximum stopped-down-aperture value difference can be read out from the lens 2. Note that in FIG. 18, "input/output" is abbreviated as "I/O". FIG. 18 shows the serial input/output operation, command output operation, and data output operation subroutines, and corresponds to FIGS. 3 and 4. As will be described later in detail, in step 71, when the subroutine in step 72 is ended, data $(AV-AV0)_{MAX}$ indicating the maximum stopped-down-aperture value difference of the lens 2 corresponding to a value of $03 (in this case, $42) is stored in a predetermined memory area M in the MCU 10. In step 73, the MCU 10 A/D converts the input at the analog input terminal IN, thereby reading the data $(AV-AV0)$, indicating the stopped-down-aperture value difference of the lens 2. The MCU 10 compares the A/D converted value of the input voltage at the terminal IN and the content of the memory M in step 73. If the preset aperture ring 23 is located at the minimum aperture position, as shown in FIG. 17C or 17D, the A/D converted value of the voltage at the input terminal IN can correspond to $42. In this case, the flow jumps to the next step (not shown) without being through step 74. If the ring 23 is not set at the minimum aperture position, as shown in FIG. 17B, the A/D converted value becomes smaller than $42, and the flow advances to step 74. In step 74, warning display of an aperture setting error is made. More specifically, the MCU 10 supplies a predetermined control signal to the display 16 to cause it to display the warning display of the aperture setting error. For example, "FEE" is displayed.

Note that in step 73, data corresponding to $03 can be simply compared with the A/D converted value at the analog input terminal IN since data format is determined such that one stopped-down-aperture value difference consists of 12 steps.

When an aperture value to be controlled is displayed in step 107 of FIG. 2, the full-aperture value can be read so as to calculate a maximum aperture value (i.e., a value for providing a minimum aperture) by the MCU 10. The maximum aperture value $AV_{max}$ is given as:

$$AV_{max} = AV0 \text{ (address \$01)} + (AV - AV0)_{max} \text{ (address \$03)}$$

It is then checked if $AVs \leq AV_{max}$ so as to discriminate whether or not the aperture can be controlled based on AVs.

What I claim is:
1. A camera system comprising:
   memory means storing data indicating a maximum stopped-down-aperture value difference of a photographing lens;
   means for detecting a preset stopped-down-aperture value difference and creating a stopped-down-aperture value difference signal;
   means for reading out the data from said memory means, detecting that the stopped-down-aperture value difference indicated by the stopped-down-aperture value difference signal is smaller than the maximum stopped-down-aperture value difference, and generating a detection signal; and
   means, responsive to said detection signal, for displaying that a preset aperture ring is not set at a maximum aperture value.

2. A camera system according to claim 1, further comprising means for locking said preset aperture ring when said preset aperture ring is set at the maximum aperture value.

3. A camera system comprising:
a first camera body having first terminal means, first memory means and first output means for outputting a first command data signal through said first terminal means;
a second camera body having second terminal means, second memory means and second output means for selectively outputting a plurality of second command data signals through said second terminal means, the amount of data that said first memory means can store being larger than the amount of data that said second memory means can store; and
accessory means selectively attachable to said first camera body and said second camera body, said accessory means having third terminal means, third memory means and third output means, said third terminal means being connected to said first terminal means when said accessory means is attached to said first camera body and being connected to said second terminal means when said accessory means is attached to said second camera body, a plurality of information data associated with photographing information being stored in said third memory means, said third output means outputting all of said plurality of information data to said first memory means through said third terminal means in response to said first command data signal, and outputting a part of said plurality of information data to said second memory means through said third terminal means in response to one of said plurality of second command data signals.

4. A camera system according to claim 3, wherein said first camera body has first calculating means responsive to the content of said first memory means, and said second camera body has second calculating means responsive to the content of said second memory means.

5. A camera system according to claim 3, wherein said second output means outputs said plurality of second command data signals one by one, and wherein said third output means outputs a different part of said information data every time said second output means outputs a different one of said plurality of second command data signals.

6. A camera system according to claim 3, wherein said accessory means is a lens provided with an optical system, said plurality of information data including data indicating an optical characteristic of said optical system.

7. A camera system comprising:
a first camera body having first terminal means, first memory means and first output means for outputting a first command data signal through said first terminal means;
a second camera body having second terminal means, second memory means and second output means for outputting a second command data signal through said second terminal means; and
accessory means selectively attachable to said first camera body and said second camera body, said accessory means having third terminal means, third memory means and third output means, said third terminal means being connected to said first terminal means when said accessory means is attached to said first camera body and being connected to said second terminal means when said accessory means is attached to said second camera body, a plurality of information data associated with photographing information being stored in said third memory means, said third output means outputting all of said plurality of information data to said first memory means through said third terminal means in response to said first command data signal, and outputting a part of said plurality of information data to said second memory means through said third terminal means in response to said second command data signal.

8. A camera system according to claim 7, wherein each of said first and second camera bodies has auto focusing means and auto exposing means, said auto focusing means and said auto exposing means of said first camera body operating on the basis of the content of said first memory means, said auto exposing means of said second camera body operating on the basis of the content of said second memory means.

9. A camera system according to claim 7, wherein said accessory means is a lens provided with an optical system, said plurality of information data including data indicating an optical characteristic of said optical system.

10. An accessory which can be attached to a camera body, including:
memory means in which a plurality of data are stored;
first and second terminal means for electrically connecting with said camera body when said accessory is attached to said camera body;
discriminating means;
transfer means for transferring a plurality of command signals of equal length from said first terminal means to said discriminating means; and
output means for outputting data stored in said memory means to said second terminal means, said discriminating means causing said output means to output all of said data stored in said memory means when a predetermined one of said plurality of command signals is transferred to said discriminating means, said discriminating means causing said output means to output a part of said data stored in said memory means when another of said plurality of command signals is transferred to said discriminating means.

11. A camera system comprising:
camera body having first and second terminals, start means for setting said first terminal at one of two different levels, response detecting means and error detecting means; and
accessory means which can be attached to said camera body, having memory means storing data therein, third and fourth terminals and response means, said third and fourth terminals being connected to said first and second terminals respectively when said accessory means is attached to said camera body, said fourth terminal being electrically connected to said memory means, said response means detecting that the level of said first terminal is set at said one of said two different levels and thereafter setting said third terminal at said one of said two different levels;
said response detecting means detecting that said third terminal is at said one of said two different levels and thereafter causing said memory means to transfer said data to said camera body through said second and fourth terminals;

said error detecting means detecting that said third terminal is not set at said one of said two different levels within a predetermined period of time from a time of setting said first terminal at said one of said two different levels and thereafter generating an error detecting signal.

12. A camera system according to claim 11, wherein said response detecting means generates a command signal in response to the setting of said third terminal at said one of said two different levels, said command signal causing said memory means to transfer said data to said camera body, and said accessory means has time detecting means for detecting if said command signal is not generated within a predetermined period of time from the setting of said third terminal at said one of said two different levels.

13. A camera system according to claim 11, wherein said accessory means is a lens provided with an optical system, said data including data indicating an optical characteristic of said optical system.

14. A lens detachably attached to a camera body which has operation means and displaying means, comprising:
(a) a preset aperture member for setting a preset aperture value;
(b) means for transferring information indicating a preset stop-down-aperture value difference to said camera body when said lens is attached to said camera body;
(c) memory means in which data corresponding to a maximum stopped-down-aperture value difference of said lens are stored; and
(d) output means for outputting said data to said camera body when said lens is attached to said camera body, said data causing said operation means to detect that said preset stopped-down-aperture value difference corresponding to said information is smaller than said maximum stopped-down-aperture value difference corresponding to said data and to generate a detection signal which causes said displaying means to display that said preset aperture member is not set at a maximum aperture value.

15. A lens according to claim 14, further comprising means for locking said preset aperture member when said preset aperture member is set at the maximum aperture value.

16. A lens detachably attached to a camera body which has operation means and displaying means, comprising:
(a) means for transferring information indicating a preset stopped-down-aperture value difference to said camera body when said lens is attached to said camera body;
(b) memory means in which data corresponding to a maximum stopped-down-aperture value difference of said lens is stored; and
(c) output means for outputting said data to said camera body when said lens is attached to said camera body.

17. A lens according to claim 16, wherein said data causes said operation means to detect that said preset stopped-down-aperture value difference corresponding to said information is smaller than said maximum stopped-down-aperture value difference corresponding to said data, and to generate a detection signal.

18. A lens according to claim 17, which further comprises a preset aperture member for setting a preset aperture value, and wherein said transferring means is responsive to said preset aperture member and said detection signal causes said displaying means to display that said preset aperture member is not set at a maximum aperture value.

19. A camera according to claim 3, wherein said first terminal means has a first terminal, said second terminal means has a second terminal and said third terminal means has a third terminal which is connected to said first terminal when said accessory means is attached to said first camera body and to said second terminal when said accessory means is attached to said second camera body, said first output means outputs said first command data signal from said first terminal, said second output means outputs said plurality of second command data signals from said second terminal, and said third output means outputs at least one of said plurality of information data from said third terminal.

20. A lens barrel which can be attached to a camera body and having a photographing optical system with a changeable optical characteristic, including:
detecting means for detecting different states of said optical characteristic of said photographing optical system and producing a detection signal corresponding to the detected state of said optical characteristic;
memory means storing a plurality of sets of optical characteristic data corresponding to different states of said optical characteristic;
terminal means for electrically connecting with said camera body when said lens barrel is attached to said camera body;
discriminating means;
transfer means for transferring a plurality of command signals of equal length from said terminal means to said discriminating means; and
output means responsive to said detection signal for outputting data stored in said memory means to said terminal means, said discriminating means causing said output means to output the entire set of data corresponding to the detected state of said optical characteristic when a predetermined one of said plurality of command signals is transferred to said discriminating means, said discriminating means causing said output means to output part of the set of data corresponding to the detected state of said optical characteristic when another of said plurality of command signals is transferred to said discriminating means.

21. A camera system, comprising a camera body and a lens detachably mountable to said camera body,
said camera body including operation means and displaying means,
said lens including a preset aperture member for setting a preset aperture value, means for transferring information indicating a preset stopped-down-aperture value difference to said camera body when said lens is attached to said camera body, memory means in which data corresponding to a maximum stopped-down-aperture value difference of said lens are stored, and output means for outputting said data to said camera body when said lens is attached to said camera body,
said operation means of said camera body detecting that said preset stopped-down-aperture value difference corresponding to said information is smaller than said maximum stopped-down-aperture value difference corresponding to said data and generating a detection signal, said detection signal causing said displaying means to display that said preset aperture member is not set at a maximum aperture value.

22. A camera system, comprising a camera body and a lens detachably mounted to said camera body, said lens including means for transferring information indicating a preset stopped-down-aperture value difference to said camera body when said lens is attached to said camera body, memory means in which data corresponding to a maximum stopped-down-aperture value difference of said lens are stored, and output means for outputting said data to said camera body when said lens is attached to said camera body, said camera body including operation means for detecting that said preset stopped-down-aperture value difference corresponding to said information is smaller than said maximum stopped-down-aperture value difference corresponding to said data.

* * * * *